(12) United States Patent
Yeom et al.

(10) Patent No.: US 9,712,583 B2
(45) Date of Patent: Jul. 18, 2017

(54) VIDEO DISPLAY DEVICE AND METHOD OF CONTROLLING THE DEVICE

(71) Applicant: LG ELECTRONICS INC., Seoul (KR)

(72) Inventors: Hyekyeong Yeom, Seoul (KR); Huisang Yoo, Seoul (KR); Kyoungsoo Moon, Seoul (KR); Steve Winston, Seoul (KR); Jungwook Park, Seoul (KR); Jinwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 380 days.

(21) Appl. No.: 14/532,668

(22) Filed: Nov. 4, 2014

(65) Prior Publication Data

US 2016/0036877 A1 Feb. 4, 2016

(30) Foreign Application Priority Data

Aug. 4, 2014 (KR) .......................... 10-2014-0099955

(51) Int. Cl.
*H04L 29/06* (2006.01)
*H04N 21/466* (2011.01)

(52) U.S. Cl.
CPC ...... *H04L 65/4084* (2013.01); *H04L 65/4076* (2013.01); *H04L 65/602* (2013.01); *H04L 65/604* (2013.01); *H04N 21/4667* (2013.01)

(58) Field of Classification Search
CPC ............... H04L 65/4084; H04L 65/604; H04L 65/4076; H04L 65/4092; H04L 65/602; H04N 21/4667

USPC ........................................................ 709/219
See application file for complete search history.

(56) References Cited

U.S. PATENT DOCUMENTS

| | | | |
|---|---|---|---|
| 9,154,668 B2 * | 10/2015 | Kim ................... | H04N 21/4316 |
| 2010/0075593 A1 * | 3/2010 | Lee ........................ | H04H 60/37 |
| | | | 455/3.06 |
| 2010/0254674 A1 | 10/2010 | Prestenback et al. | |
| 2011/0157051 A1 * | 6/2011 | Shohga .................... | G06F 3/041 |
| | | | 345/173 |
| 2013/0271661 A1 | 10/2013 | Kimura et al. | |
| 2014/0028915 A1 * | 1/2014 | Kim ................... | H04N 21/4316 |
| | | | 348/518 |
| 2014/0035942 A1 * | 2/2014 | Yun ........................ | G09G 5/006 |
| | | | 345/592 |
| 2015/0261295 A1 * | 9/2015 | Lee ........................ | G06F 3/013 |
| | | | 345/157 |

FOREIGN PATENT DOCUMENTS

JP 2012053575 A 3/2012
KR WO 2016021762 A1 * 2/2016 ........... H04L 65/604

* cited by examiner

*Primary Examiner* — Michael C Lai
(74) *Attorney, Agent, or Firm* — LG Electronics Inc.

(57) ABSTRACT

A method of operating a video display device including a display unit is provided. The method includes: playing uncompressed audio-visual content through a first layer of the display unit; obtaining content information on the uncompressed audio-visual content based on some of the uncompressed audio-visual content; obtaining an enhanced service based on the content information; and playing an obtained enhanced service through a second layer of the display unit, wherein the first layer and the second layer are overlapped each other.

16 Claims, 21 Drawing Sheets

— LIVE TV APPLICATION PROCESSING REGION

— ACR APPLICATION PROCESSING REGION

VIDEO DISPLAY DEVICE AND METHOD OF CONTROLLING THE DEVICE

CROSS-REFERENCE TO RELATED APPLICATIONS

This application claims the benefit of Korean Patent Application No. 10-2014-0099955, filed on Aug. 4, 2014 entitled "VIDEO DISPLAY DEVICE AND OPERATING METHOD THEREOF", which is hereby incorporated by reference in its entirety into this application.

BACKGROUND

The present disclosure relates to a video display device and a method of controlling the device.

As digital broadcasting is paving the way for its extensive spread, a broadcasting station transmits both main audio-visual (AV) contents and enhanced service data, which may be linked to the main AV contents to provide information and services or may be separately provided for other purposes.

However, a video display device in each home may unlikely receive broadcast signals directly through air under a current broadcasting environment. Rather, most of cases, a video display device in each home is connected to a broadcast receiving device to display uncompressed audio-visual contents that the broadcast receiving device provides.

Additionally, the broadcast receiving device receives contents from a server (called a Multichannel Video Programming Distributor (MVPD)). The MVPD receives a broadcast signal from a broadcasting station, extracts contents from the received broadcast signal, converts the extracted content into signals having a proper format for transmission, and provides the converted signals to a broadcast receiving device. During these processes, the MVPD may exclude extracted enhanced service data or may add another enhanced service data, so that the broadcasting station may serve to provide AV contents but may not provide enhanced services led by the broadcasting station.

The MVPD provides the broadcast receiving device with a plurality of channels provided by content providers as a package.

Since the broadcast receiving device extracts main AV data from signal received from the MVPD and provides only uncompressed audio-visual data to a video display device, only enhanced services provided from the broadcast receiving device not the video display device are available. Furthermore, the broadcasting station may not provide enhanced services led by itself.

SUMMARY

Embodiments provide a video display device and a method of operating the device that may separate a layer for uncompressed audio-visual content from a layer for enhanced services to provide various user experiences.

In one embodiment, a method of operating a video display device including a display unit includes: playing uncompressed audio-visual content through a first layer of the display unit; obtaining content information on the uncompressed audio-visual content based on some of the uncompressed audio-visual content; obtaining an enhanced service based on the content information; and playing an obtained enhanced service through a second layer of the display unit, wherein the first layer and the second layer are overlapped each other.

In another embodiment, a video display device includes a display unit including a first layer and a second layer; a reception unit obtaining uncompressed audio-visual content; an enhanced service management unit obtaining content information on the uncompressed audio-visual content based on some of the uncompressed audio-visual content, wherein the enhanced service management unit obtains an enhanced service based on the content information; and a play controlling unit playing the uncompressed audio-visual content and the enhanced service on the display unit, wherein the enhanced service management unit plays the uncompressed audio-visual content through the first layer, enables the play controlling unit to play the enhanced service through the second layer and the first layer and the second layer are overlapped each other.

According to various embodiments of the present invention, there is an effect that it is possible to provide various user experiences by separating a layer for uncompressed audio-visual content from a layer for enhanced services.

DETAILED DESCRIPTION OF THE EMBODIMENTS

Hereinafter, a mobile terminal relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 1 to 9 according to an embodiment.

Figure 1:
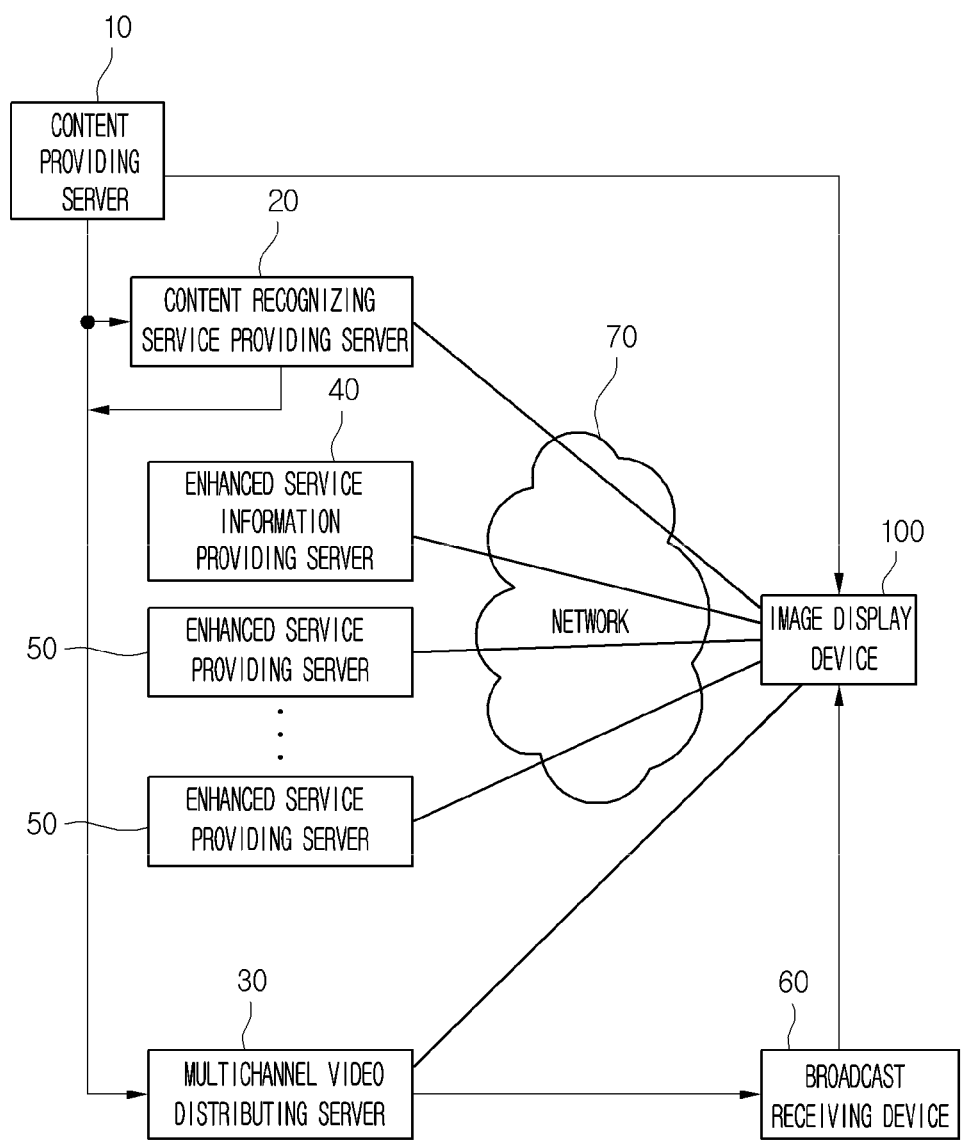
FIG. 1 is a block diagram of a network topology according to an embodiment.

FIG. 1 is a block diagram illustrating the network topology according to the embodiment.

As shown in FIG. 1, the network topology includes a content providing server 10, a content recognizing service providing server 20, a multi channel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts feature information from some frames or audio samples of the main audio-visual content and stores it. This feature information is called signature.

The multi channel video distributing server 30 receives and multiplexes broadcast signals from a plurality of broadcasting stations and provides the multiplexed broadcast signals to the broadcast receiving device 60. Especially, the multi channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main AV content to the video display device 100 through its external input port.

The enhanced service information providing server 40 provides enhanced service information on at least one available enhanced service relating to a main AV content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main AV content in response to a request of a video display device. There may be at least one enhanced service providing server.

The video display device 100 may be a television, a notebook computer, a hand phone, and a smart phone, each including a display unit. The video display device 100 may receive an uncompressed main AV content from the broadcast receiving device 60 or a broadcast signal including an encoded main AV content from the contents providing server 10 or the multi channel video distributing server 30. The video display device 100 may receive a content recognizing service from the content recognizing service providing server 20 through the network 70, an address of at least one available enhanced service relating to a main AV content from the enhanced service information providing server 40 through the network 70, and at least one available enhanced service relating to a main AV content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

Figure 2:
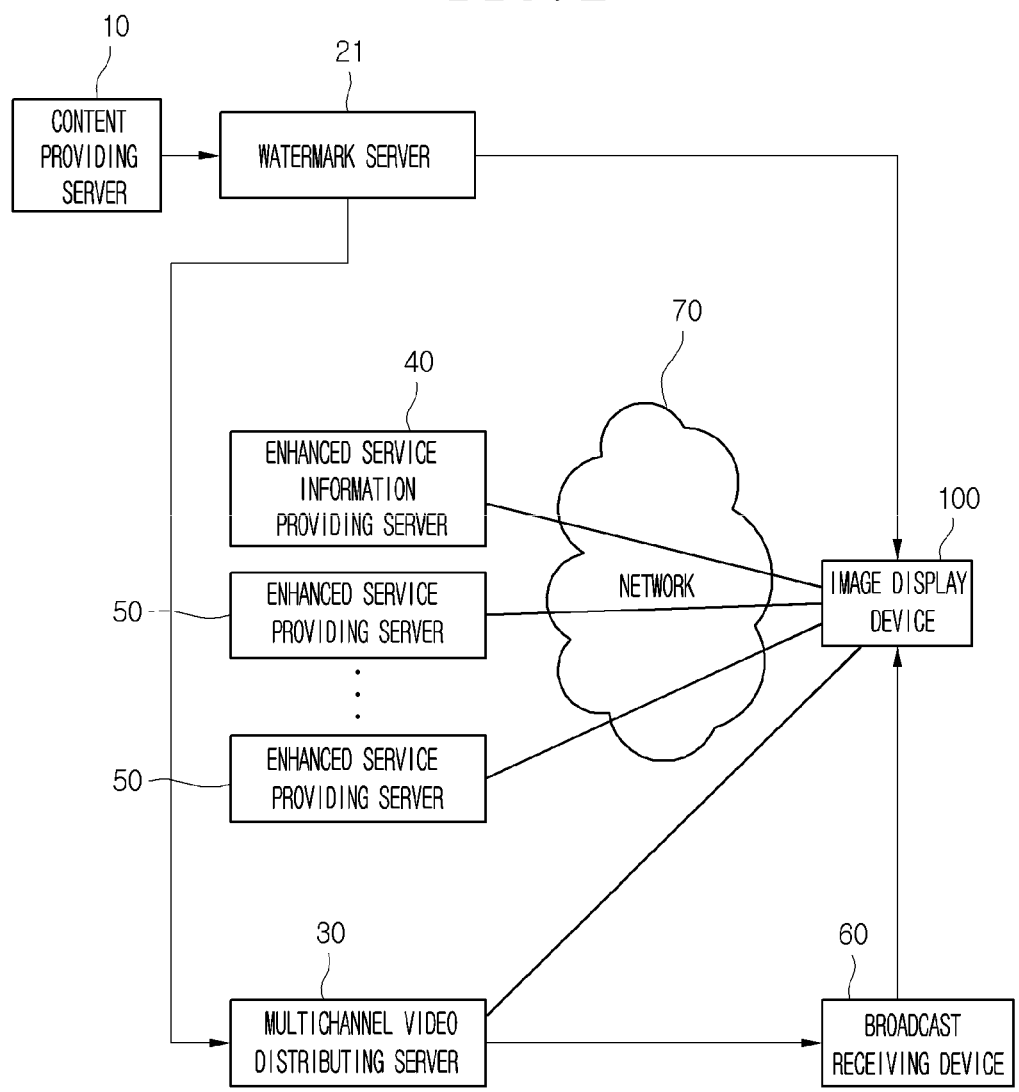
FIG. 2 is a block diagram of a watermark based network topology according to an embodiment.

FIG. 2 is a block diagram illustrating a watermark based network topology according to an embodiment.

As shown in FIG. 2, the watermark based network topology may further include a watermark server 21.

As shown in FIG. 2, the watermark server 21 edits a main AV content to insert content information into it. The multi channel video distributing server 30 may receive and distribute a broadcast signal including the modified main AV content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

Figure 3:
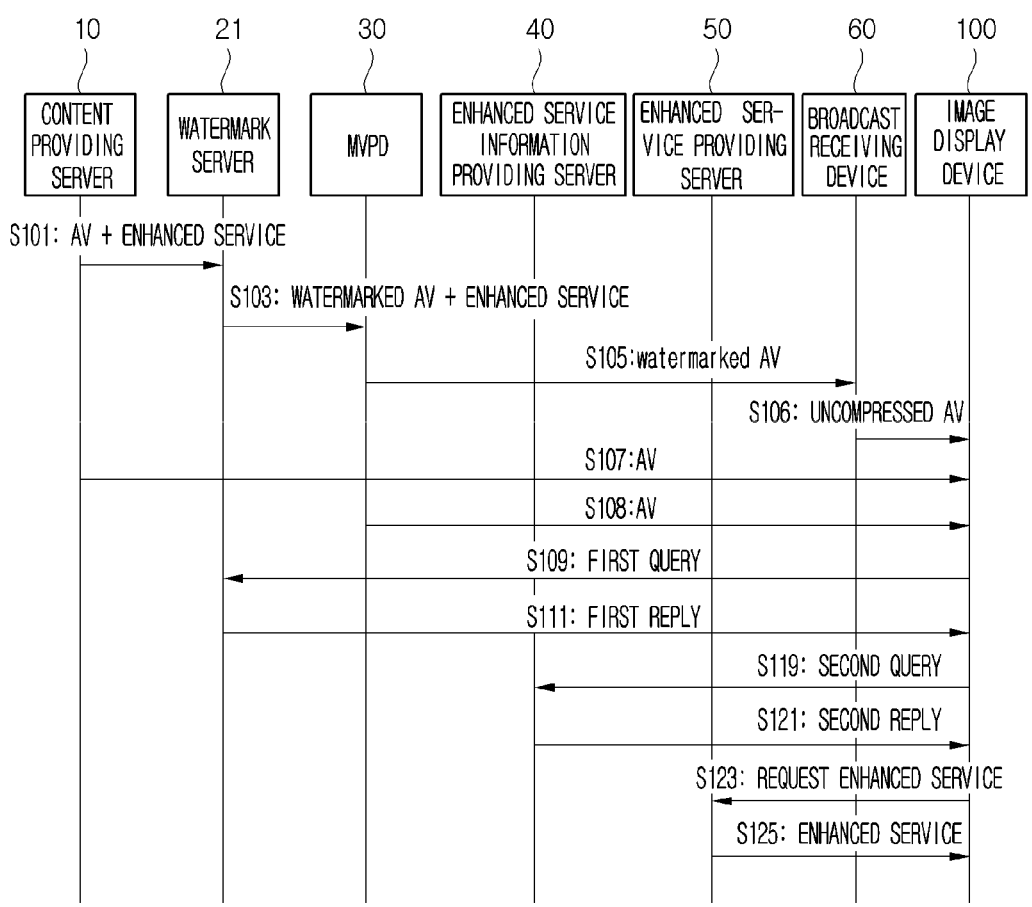
FIG. 3 is a ladder diagram of a data flow in a watermark based network topology according to an embodiment.

FIG. 3 is a ladder diagram illustrating a data flow in a watermark based network topology according to an embodiment.

First, the content providing server 10 transmits a broadcast signal including a main AV content and an enhanced service in operation S101.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main AV content, main AV content identification information, time information of a content section used in content information acquisition, names of channels through which main AV content is broadcasted, logos of channels through which main AV content is broadcasted, descriptions of channels through which main AV content is broadcasted, a usage information reporting period, the minimum usage time for usage information acquisition, and available enhanced service information relating to main AV content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where feature information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main AV content watching information reporting address and an enhanced service usage information reporting address. The usage information reporting period may include at least one of a main AV content watching information reporting period and an enhanced service usage information reporting period. A minimum usage time for usage information acquisition may include at least one of a minimum watching time for a main AV content watching information acquisition and a minimum usage time for enhanced service usage information extraction.

On the basis that a main AV content is watched for more than the minimum watching time, the video display device 100 acquires watching information of the main AV content and reports the acquired watching information to the main AV content watching information reporting address in the main AV content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP or Advanced Television Systems Committee—Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main AV content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main AV content including a logo with the barcode inserted.

For example, the watermark server 21 may insert watermark information as a metadata form of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main AV content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S106.

Moreover, the content providing server 10 also broadcasts a broadcast signal including a main AV content through a wireless channel in operation S107.

Additionally, the MVPD 30 may directly transmit a broadcast signal including a main AV content to the video display device 100 without going through the broadcast receiving device 60 in operation S108.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from some frames or a section of audio samples of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S109.

The watermark server 21 provides a first reply to the first query in operation S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

Figure 4:
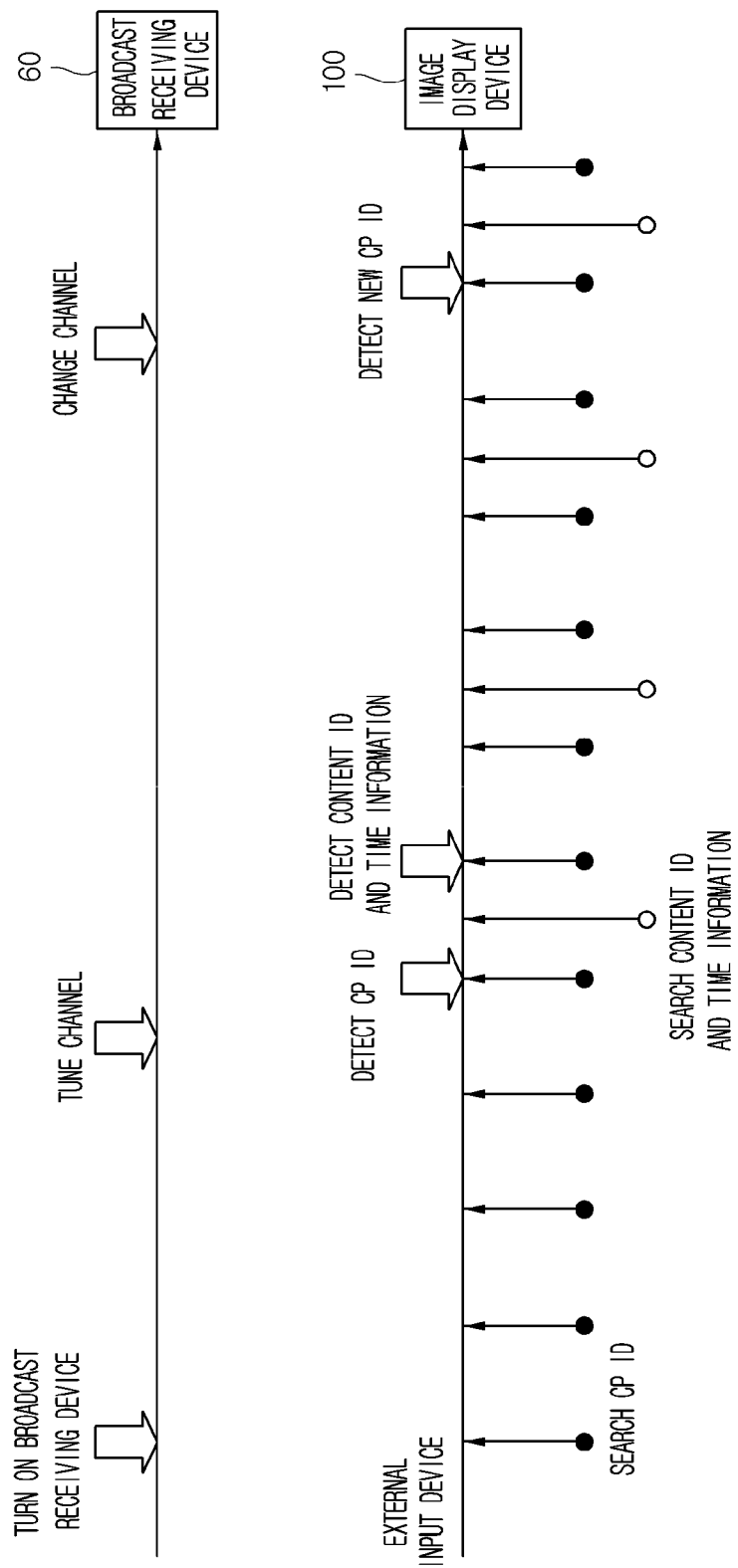
FIG. 4 shows a watermark based content recognition timing according to an embodiment.

FIG. 4 is a view illustrating a watermark based content recognition timing according to an embodiment.

As shown in FIG. 4, when the broadcast receiving device 60 is turned on and tunes a channel, and also, the video display device 100 receives a main AV content of the turned channel from the broadcast receiving device 60 through an external input port 111, the video display device 100 may sense a content provider identifier (or a broadcasting station identifier) from the watermark of the main AV content. Then, the video display device 100 may sense content information from the watermark of the main AV content on the basis of the sensed content provider identifier.

At this point, as shown in FIG. 4, the detection available period of the content provider identifier may be different from that of the content information. Especially, the detection available period of the content provider identifier may be shorter than that of the content information. Through this, the video display device 100 may have an efficient configuration for detecting only necessary information.

Figure 5:
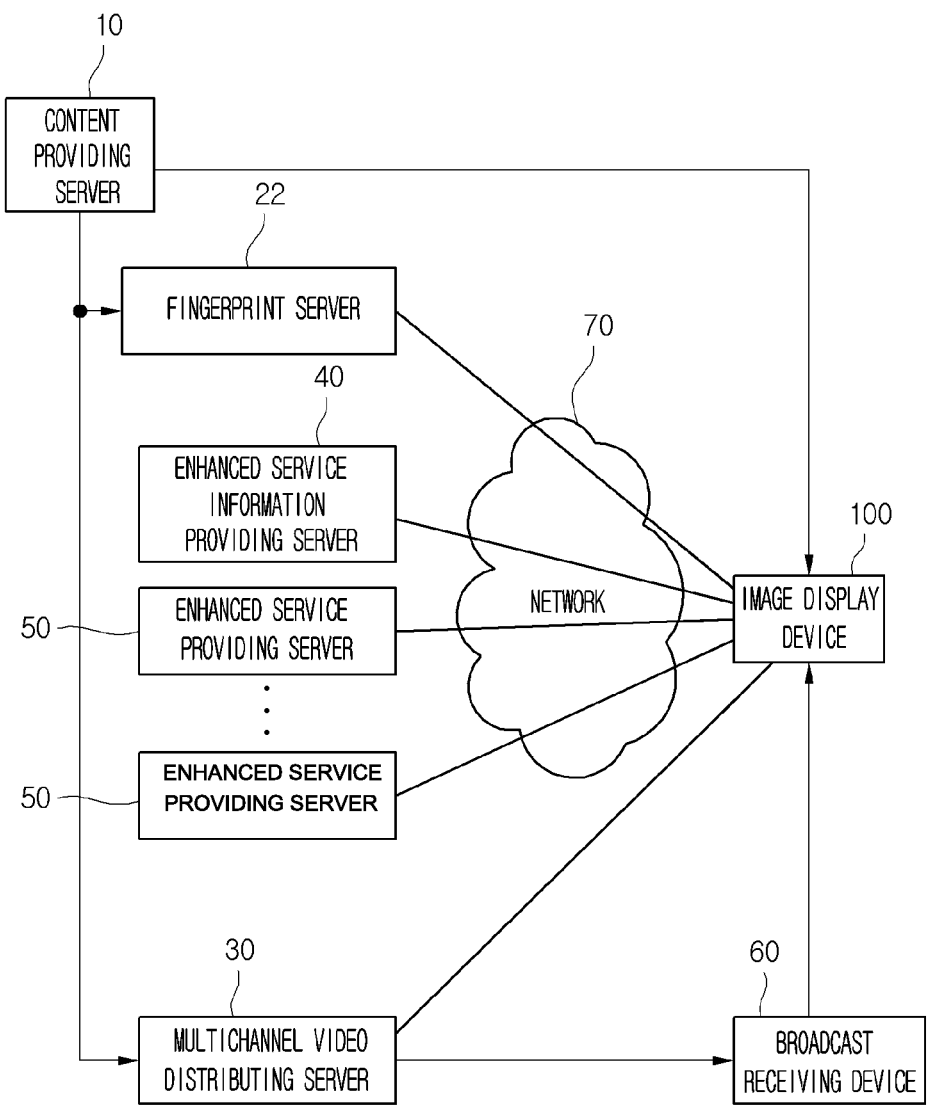
FIG. 5 is a block diagram of a fingerprint based network topology according to an embodiment.

FIG. 5 is a block diagram illustrating a fingerprint based network topology according to an embodiment.

As shown in FIG. 5, the network topology may further include a fingerprint server 22.

As shown in FIG. 5, the fingerprint server 22 does not edit a main AV content, but extracts feature information from some frames or a section of audio samples of the main AV content and stores the extracted feature information. Then, when receiving the feature information from the video display device 100, the fingerprint server 22 provides an identifier and time information of an AV content corresponding to the received feature information.

Figure 6:
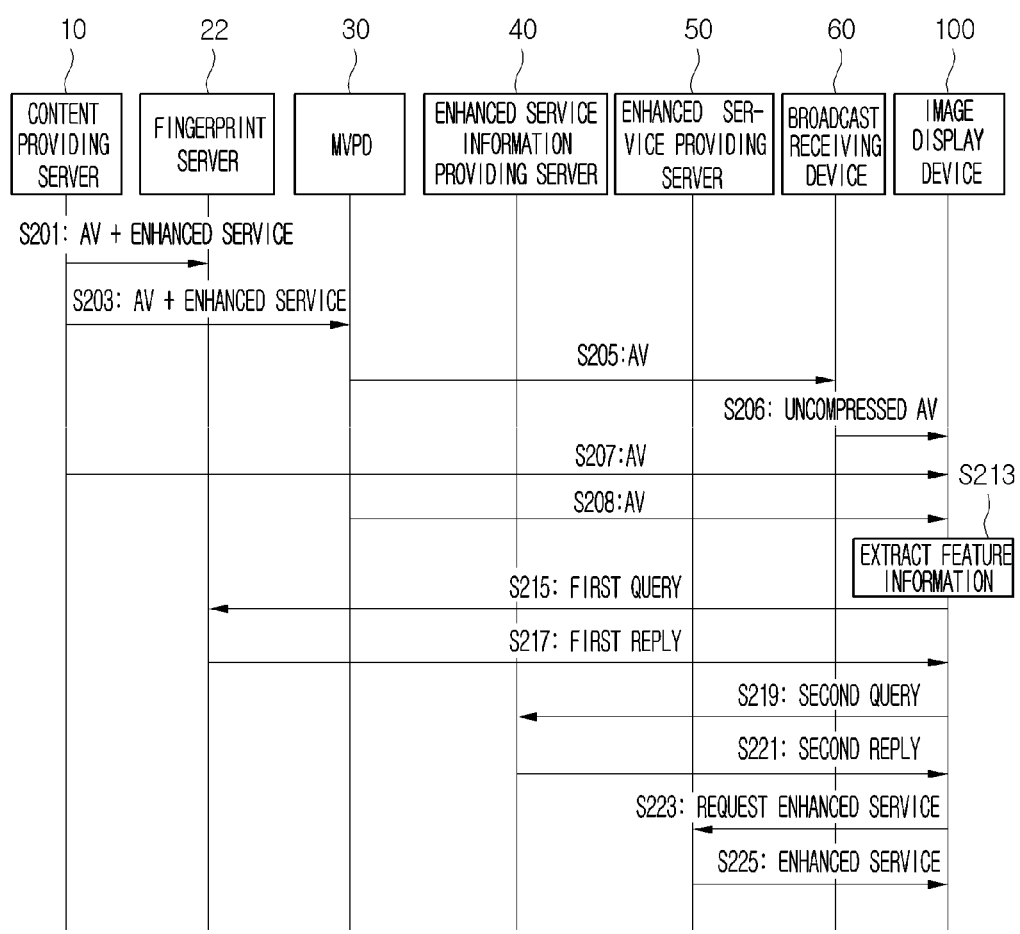
FIG. 6 is a ladder diagram of a data flow in a fingerprint based network topology according to an embodiment.

FIG. 6 is a ladder diagram illustrating a data flow in a fingerprint based network topology according to an embodiment.

First, the content providing server 10 transmits a broadcast signal including a main AV content and an enhanced service in operation S201.

The fingerprint server 22 receives a broadcast signal that the content providing server 10, extracts a plurality of pieces of feature information from a plurality of frame sections or a plurality of audio sections of the main AV content, and establishes a database for a plurality of query results corresponding to the plurality of feature information in operation S203. The query result may include at least one of content information, enhanced service information, and an available enhanced service.

The MVPD 30 receives broadcast signals including a main AV content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S206.

Moreover, the content providing server 10 also broadcasts a broadcast signal including a main AV content through a wireless channel in operation S207.

Additionally, the MVPD 30 may directly transmit a broadcast signal including a main AV content to the video display device 100 without going through the broadcast receiving device 60.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts feature information from some frames or a section of audio samples of the obtained main AV content in operation S213.

The video display device 100 accesses the fingerprint server 22 corresponding to the predetermined fingerprint server address to transmit a first query including the extracted feature information in operation S215.

The fingerprint server 22 provides a query result as a first reply to the first query in operation S217. If the first reply corresponds to fail, the video display device 100 accesses the fingerprint server 22 corresponding to another fingerprint server address to transmit a first query including the extracted feature information.

The fingerprint server 22 may provide Extensible Markup Language (XML) document as a query result. Examples of the XML document containing a query result will be described with reference to FIG. 7 and Table 1.

Figure 7:
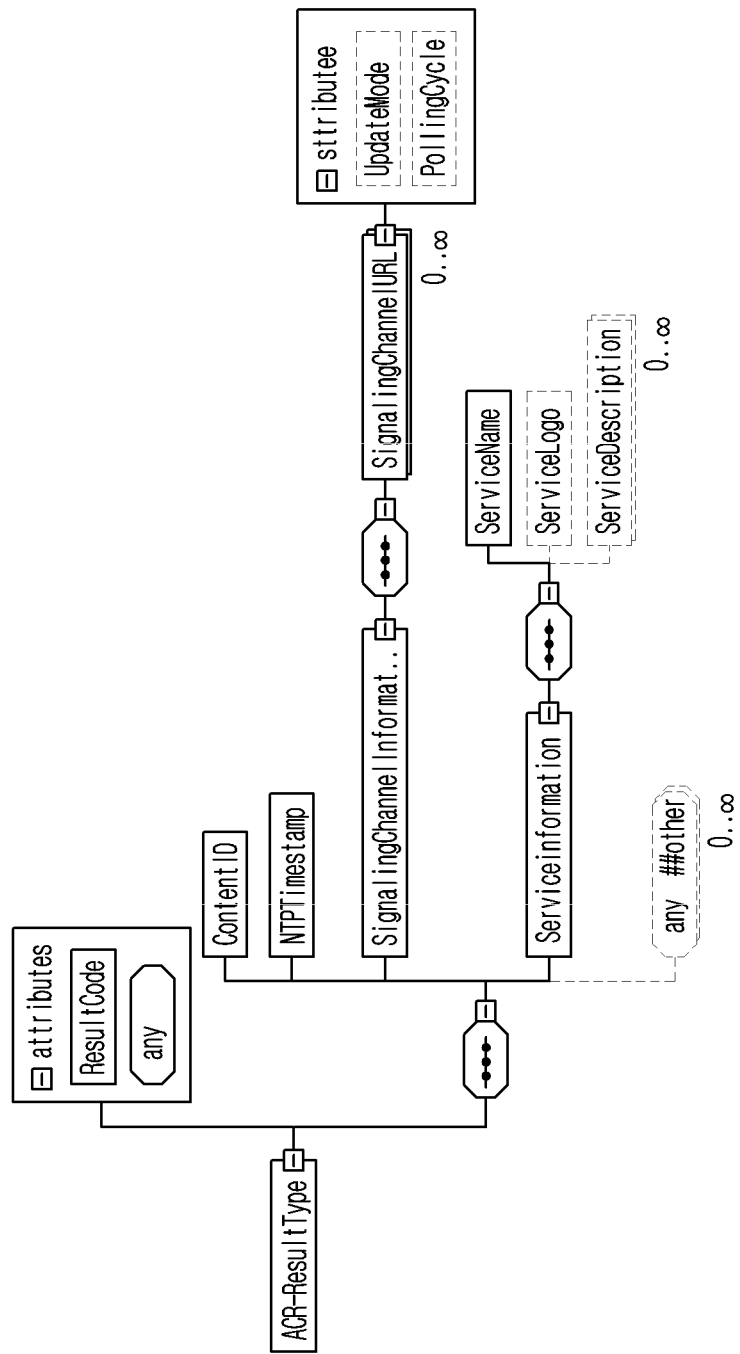
FIG. 7 is an XML schema diagram of ACR-Resulttype containing a query result according to an embodiment.

FIG. 7 is a view illustrating an XML schema diagram of ACR-Resulttype containing a query result according to an embodiment.

As shown in FIG. 7, ACR-Resulttype containing a query result includes ResultCode attributes and ContentID, NTP-Timestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value.

The ServiceInformation element includes ServiceName, ServiceLogo, and ServiceDescription elements.

Table 1 illustrates an XML schema of ACR-ResultType containing the query result.

TABLE 1

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL" maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle" type="xs:unsignedInt"/>
                                </xs:extension>
                            </xs:simpleContent>
                        </xs:complexType>
                    </xs:element>
                </xs:sequence>
            </xs:complexType>
```

TABLE 1-continued

```
    </xs:element>
    <xs:element name="ServiceInformation">
        <xs:complexType>
            <xs:sequence>
                <xs:element name="ServiceName" type="xs:string"/>
                <xs:element name="ServiceLogo" type="xs:anyURI" minOccurs="0"/>
                <xs:element name="ServiceDescription" type="xs:string" minOccurs="0" maxOccurs="unbounded"/>
            </xs:sequence>
        </xs:complexType>
    </xs:element>
    <xs:any namespace="##other" processContents="skip" minOccurs="0" maxOccurs="unbounded"/>
    </xs:sequence>
    <xs:attribute name="ResultCode" type="xs:string" use="required"/>
    <xs:anyAttribute processContents="skip"/>
</xs:complexType>
```

As the ContentID element, an ATSC content identifier may be used as shown in Table 2.

TABLE 2

| Syntax | The Number of bits | format |
|---|---|---|
| ATSC_content_identifier( ) { | | |
|    TSID | 16 | uimsbf |
|    reserved | 2 | bslbf |
|    end_of_day | 5 | uimsbf |
|    unique_for | 9 | uimsbf |
|    content_id | var | |
| } | | |

As shown in Table 2, the ATSC content identifier has a structure including TSID and a house number.

The 16 bit unsigned integer TSID carries a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major>69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1
urn:oma:bcast:iauth:atsc:service:us:0:100.200

Moreover, as the ContentID element, an ATSC content identifier may be used as described below.

The ATSC content identifier has the following form.
urn:oma:bcast:iauth:atsc:content:<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by ".".<serviceid>. <xsid> for (regional service) (major>69) is <serviceid>. <content_id> is a base64 sign of a content_id field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S221.

If the video display device 100 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

Figure 8:
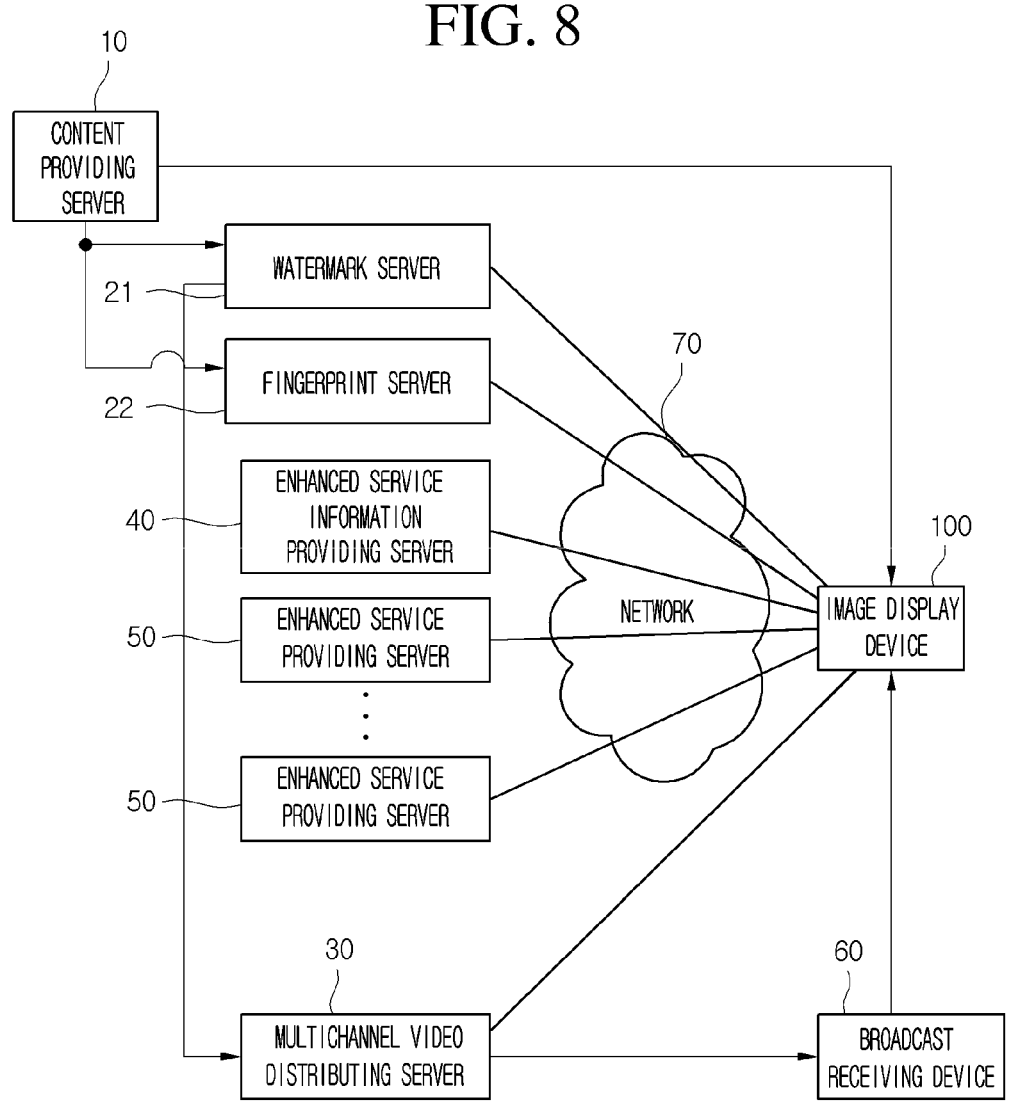
FIG. 8 is a block diagram of a watermark and fingerprint based network topology according to an embodiment.

FIG. 8 is a block diagram illustrating a watermark and fingerprint based network topology according to an embodiment.

As shown in FIG. 8, the watermark and fingerprint based network topology may further include a watermark server 21 and a fingerprint server 22.

As shown in FIG. 8, the watermark server 21 inserts content provider identifying information into a main AV content. The watermark server 21 may insert content provider identifying information as a visible watermark such as a logo or an invisible watermark into a main AV content.

The fingerprint server 22 does not edit a main AV content, but extracts feature information from some frames or a certain section of audio samples of the main AV content and stores the extracted feature information. Then, when receiving the feature information from the video display device 100, the fingerprint server 22 provides an identifier and time information of an AV content corresponding to the received feature information.

Figure 9:
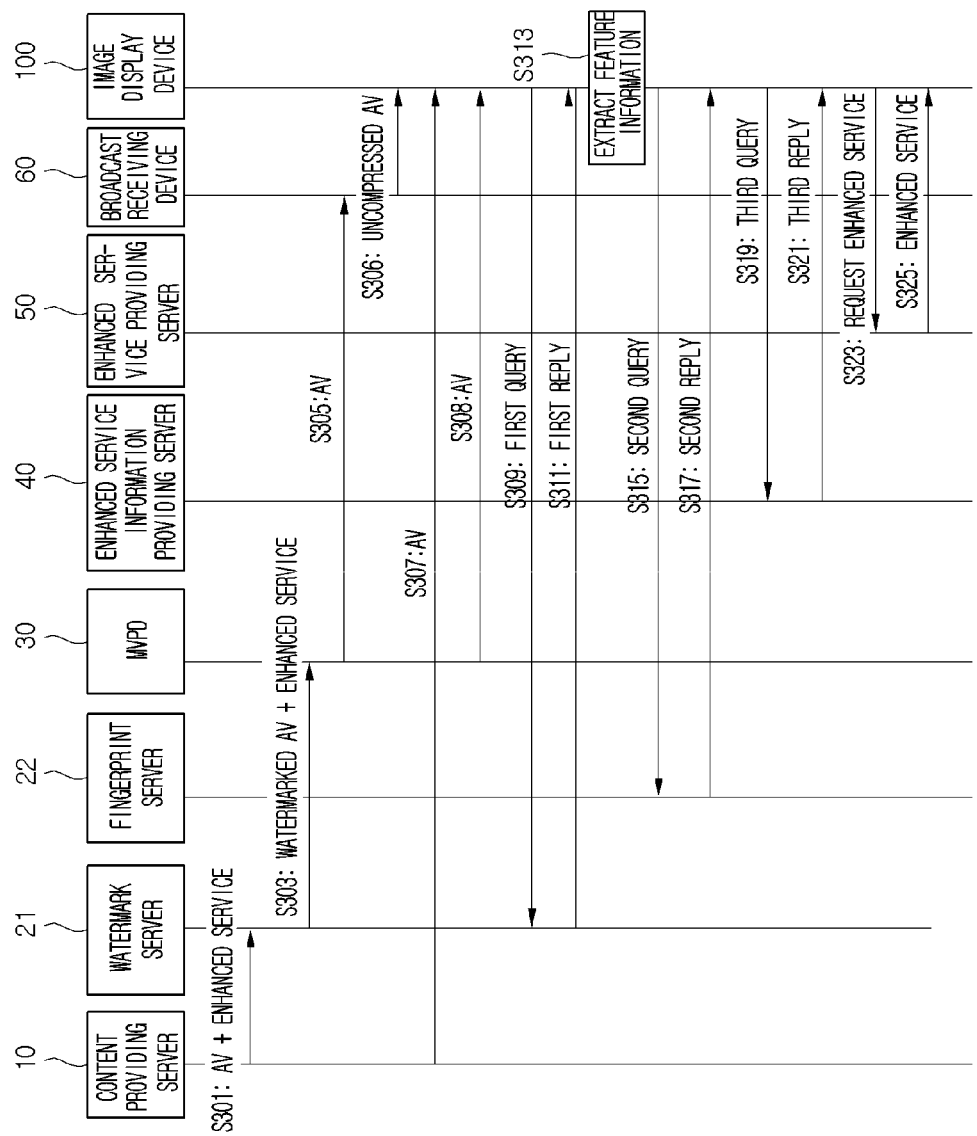
FIG. 9 is a ladder diagram of a data flow in a watermark and fingerprint based network topology according to an embodiment.

FIG. 9 is a ladder diagram illustrating a data flow in a watermark and fingerprint based network topology according to an embodiment.

First, the content providing server 10 transmits a broadcast signal including a main AV content and an enhanced service in operation S301.

The watermark server 21 receives a broadcast signal that the content providing server 10 provides, inserts a visible watermark such as a logo or watermark information as an invisible watermark into the main AV content by editing the main AV content, and provides the watermarked main AV content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main AV content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main AV content, and then, provides the generated uncompressed main AV content to the video display device 100 in operation S306.

Moreover, the content providing server 10 also broadcasts a broadcast signal including a main AV content through a wireless channel in operation S307.

Additionally, the MVPD 30 may directly transmit a broadcast signal including a main AV content to the video display device 100 without going through the broadcast receiving device 60 in operation S308.

The video display device 100 may receive an uncompressed main AV content through the broadcast receiving device 60. Additionally, the video display device 100 may receive a broadcast signal through a wireless channel, and then, may demodulate and decode the received broadcast signal to obtain a main AV content. Additionally, the video display device 100 may receive a broadcast signal from the MVPD 30, and then, may demodulate and decode the received broadcast signal to obtain a main AV content. The video display device 100 extracts watermark information from audio samples in some frames or periods of the obtained main AV content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main AV content only with the logo. Additionally, when the watermark information does not include content information, the video display device 100 cannot identify the main AV content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main AV content the video display device 100 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 100 extracts feature information from some frames or a certain section of audio samples of the main AV content in operation S313.

The video display device 100 accesses the fingerprint server 22 corresponding to the fingerprint server address in the first reply to transmit a second query including the extracted feature information in operation S315.

The fingerprint server 22 provides a query result as a second reply to the second query in operation S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 100 enhanced service information for at least one available enhanced service as a third reply to the third query in operation S321.

If the video display device 100 obtains at least one available enhanced service address through the first reply, the second reply, or the third reply, it accesses the at least one available enhanced service address to request enhanced service in operation S323, and then, obtains the enhanced service in operation S325.

Then, referring to FIG. 10, the video display device 100 will be described according to an embodiment.

Figure 10:
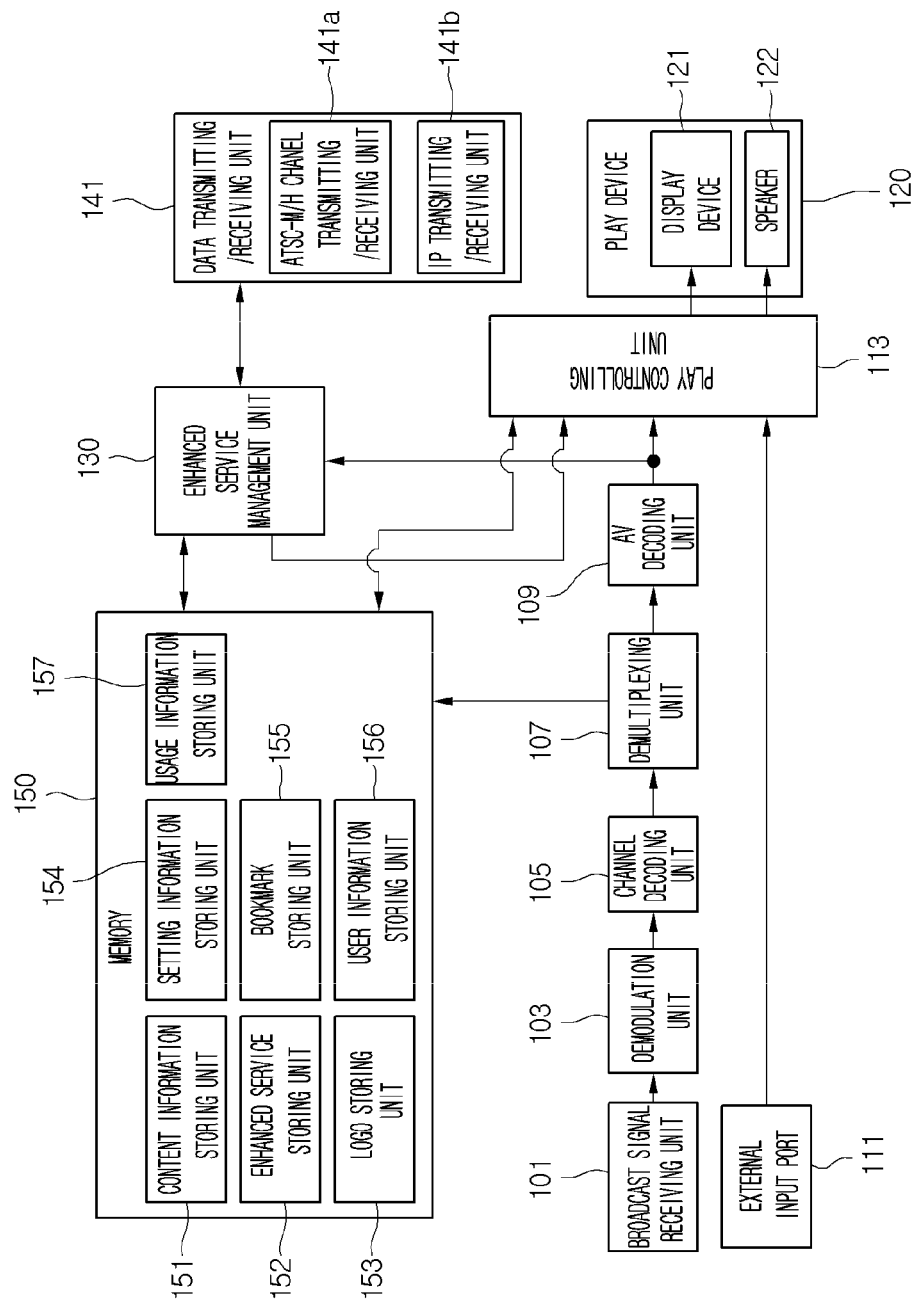
FIG. 10 is a block diagram of the video display device according to an embodiment.

FIG. 10 is a block diagram illustrating the video display device according to the embodiment.

As shown in FIG. 10, the video display device 100 includes a broadcast signal receiving unit 101, a demodulation unit 103, a channel decoding unit 105, a demultiplexing unit 107, an AV decoding unit 109, an external input port 111, a play controlling unit 113, a play device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main AV content and enhanced service from the channel-decoded data. The separated enhanced service is stored in an enhanced service storage unit 152.

The AV decoding unit 109 performs AV decoding on the separated main AV content to generate an uncompressed main AV content.

Moreover, the external input port 111 receives an uncompressed main AV content from the broadcast receiving device 60, a digital versatile disk (DVD) player, a Blu-ray disk player, and so on. The external input port 111 may include at least one of a DSUB port, a High Definition Multimedia Interface (HDMI) port, a Digital Visual Interface (DVI) port, a composite port, a component port, and an S-Video port.

The play controlling unit 113 controls the play device 120 to play at least one of an uncompressed main AV content that the AV decoding unit 109 generates and an uncompressed main AV content received from the external input port 111 according to a user's selection.

The play device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main AV content and obtains available enhanced service on the basis of the obtained content information. Especially, as described above, the enhanced service management unit 130 may obtain the identification information of the main AV content on the basis of some frames or a certain section of audio samples the uncompressed main AV content. This is called automatic contents recognition (ACR) in this specification.

The data transmitting/receiving unit 141 may include an Advanced Television Systems Committee—Mobile/Handheld (ATSC-M/H) channel transmitting/receiving unit 141a and an IP transmitting/receiving unit 141b.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk.

The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of feature information.

The enhanced service storage unit 152 may store a plurality of enhanced services corresponding to a plurality of feature information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main AV content watching information and enhanced service usage information within the set range. The usage information range may be set in each virtual channel. Additionally, the usage information measurement allowable range may be set over an entire physical channel.

The usage information providing unit 157 stores the main AV content watching information and the enhanced service usage information, which are collected by the video display device 100. Additionally, the video display device 100 analyzes a service usage pattern on the basis of the collected main AV content watching information and enhanced service usage information, and stores the analyzed service usage pattern in the usage information storage unit 157.

The enhanced service management unit 130 may obtain the content information of the main AV content from the fingerprint server 22 or the content information storage unit 151. If there is no content information or sufficient content information, which corresponds to the extracted feature information, in the content information storage unit 151, the enhanced service management unit 130 may receive additional content information through the data transmitting/ receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main AV content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main AV content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Hereinafter, referring to FIGS. 11 and 18, the enhanced service management unit 130 will be described according to various embodiments.

Figure 11:
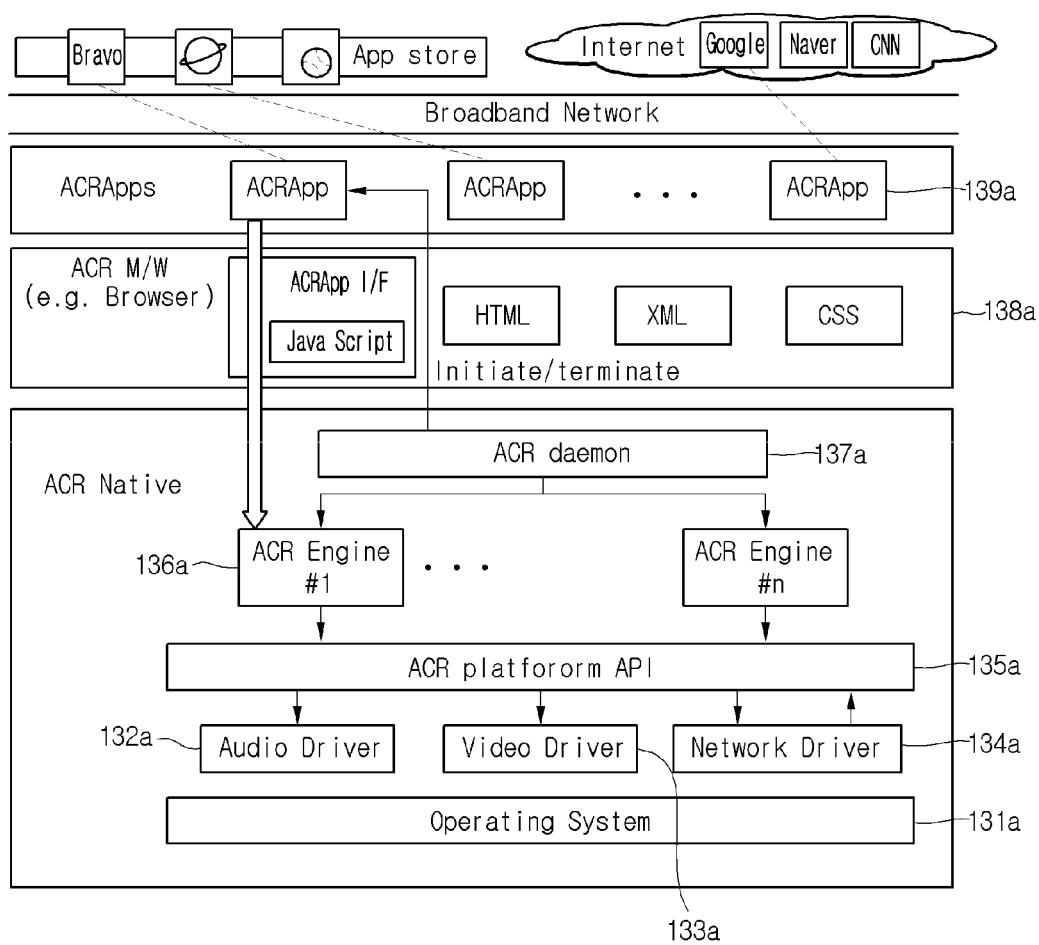
FIG. 11 is a hierarchy diagram of an enhanced service management unit according to an embodiment.

FIG. 11 is a hierarchy diagram of an enhanced service management unit according to an embodiment.

As shown in FIG. 11, the enhanced service management unit 130 may include an operating system 131a, an audio driver 132a, a video driver 133a, a network driver 134a, an ACR platform application program interface (API) 135a, at least one ACR engine 136a, an ACR daemon 137a, an ACR middleware 138a, and at least one ACR application 139a.

When the enhanced service management unit 130 is used as shown in FIG. 11, a user doesn't need to necessarily recognize a channel or content and an ACR operation may be performed always.

The enhanced service management unit 130 may access an application store through the data transmitting/receiving unit 141 to download application.

The audio driver 132a may access an audio buffer used for audio fingerprint or audio watermark.

The video driver 133a may access a video buffer used for video fingerprint or video watermark.

The network driver 134a allows the ACR engine 136a to access the data transmitting/receiving unit 141.

The platform API 135a provides API to allow the ACR engine 136a to access the audio driver 132a, the video driver 133a, and the network driver 134a.

Since a plurality of broadcasting stations or content providers use respectively different content recognizing services, the video display device 100 may include a plurality of ACR engines 136a. That is, the video display device 100 may include an ACR engine for at least one of a plurality of video watermark extraction algorithms, a plurality of audio watermark extraction algorithms, a plurality of video signature extraction algorithms, and a plurality of audio signature extraction algorithms. The watermark based ACR engine 136a may extract watermark information, and then, may obtain at least one of a watermark purpose, content information, enhanced service information, and an available enhanced service from the extracted watermark information. The fingerprint based ACR engine 136a may extract feature information of a certain section of a main AV content, and then, may obtain at least one of content information, enhanced service information, and an available enhanced service on the basis of the extracted feature information.

The ACR daemon 137a manages at least one ACR engine 136a. The daemon is executed continuously to process a periodic service request. The daemon appropriately delivers the collected requests to allow another program to process them. The ACR daemon 137a may manage the execution and termination of the ACR engine 136a. The ACR daemon 137a searches an ACR engine matching to a current main AV content among a plurality of ACR engines 136a. Especially, if a system resource is consumed greatly because several ACR engines are executed, the ACR daemon 137a sequentially executes the plurality of ACR engines 136a one by one according to a specific rule or priority to confirm whether content recognition is successful. Additionally, if one of the plurality of ACR engines 136a is successful in content recognition, the ACR daemon 137a obtains and executes an ACR application 139a corresponding to an enhanced service for the recognized content. While the ACR engine 136a performs the content recognition successfully, if contents are not recognized any more due to a channel change, the ACR daemon 137a may terminate the ACR application 139a.

The ACR middleware 138a serves as a browser for at least one ACR application 139a.

The ACR application 139a may provide user experience enhanced by ACR to a user. The ACR application 139a may be an application downloaded from an application store or the Internet or may be a simple Uniform Resource Locator (URL). The ACR application 139a may provide content target advertisement, a content provider portal service, a program specific service such as electronic program guide (EPG), or a content provider specific service. While the ACR application 139a interact with the ACR engine 136a through the ACR application, it receives content information or signature from the ACR engine 136a and additionally obtains an enhanced service corresponding to the content information or signature to play them in the play device 120.

Figure 12C:
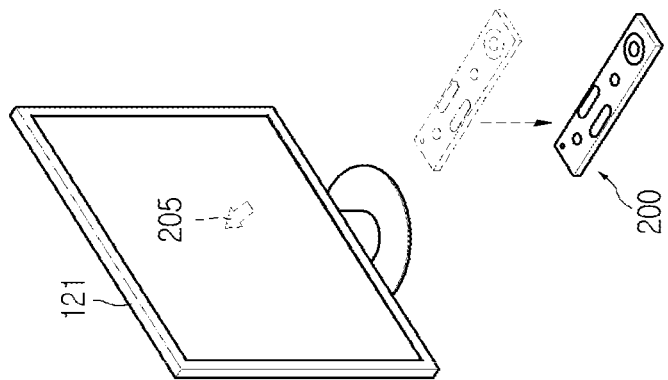
FIGS. 12a to 12c are an example of utilizing a remote control unit according to an embodiment.
Figure 12B:
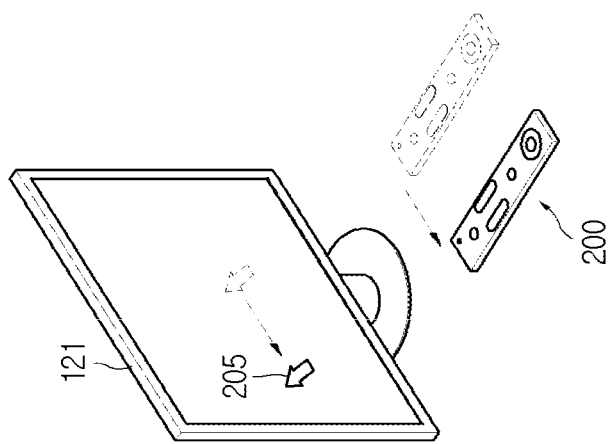
Figure 12A:
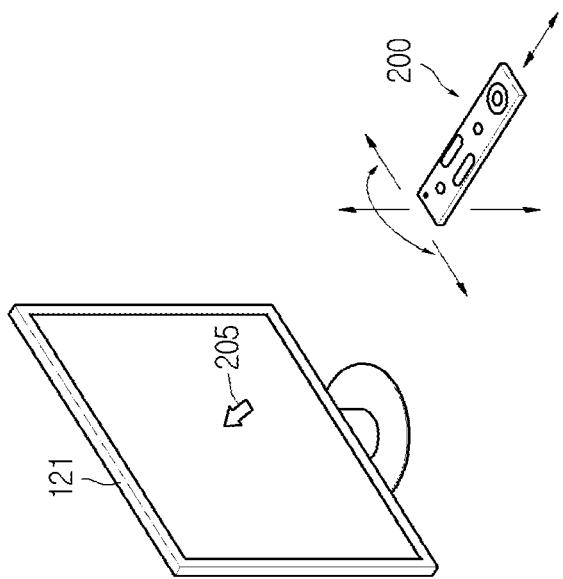

Next, FIGS. 12a to 12c are described.

FIGS. 12a to 12c are an example of utilizing a remote control unit according to an embodiment.

The remote control unit 200 may include an RF module that may transmit and receive a signal to and from the video display device 100 according to an RF communication protocol, and an IR module that may transmit and receive a signal to and from the video display device 100 according to an IR communication protocol.

Also, the remote control unit 200 transmits a signal containing information on the motion of the remote control unit 200 to the video display device 100 through the RF module.

The remote control unit 200 may receive a signal transmitted by the video display device 100 through the RF module and transmit a command on power ON/OFF, a channel change, or volume control to the video display device 100 through the IR module as needed.

FIG. 12a illustrates when a pointer 205 corresponding to the remote control unit 200 is displayed on the display unit 121.

A user may move the remote control unit 200 vertically or laterally or rotate it. The pointer 205 displayed on the display unit 121 of the display device 100 corresponds to the motion of the remote control unit 200. The remote control unit 200 may be named as a spatial remote control because that pointer 205 is moved and displayed according to a motion on a 3D space as shown.

FIG. 12b illustrates that when a user moves the remote control unit 200 to the left, the pointer 205 displayed on the display unit 121 of the display device 100 also moves to the left correspondingly.

Information on the motion of the remote control unit 200 sensed through the sensor of the remote control unit 200 is transmitted to the display device 100. The display device 100 may calculate the coordinates of the pointer 205 from information on the motion of the remote control unit 200. The display device 100 may display the pointer 205 to correspond to calculated coordinates.

FIG. 12c illustrates when a user moves the remote control unit 200 away from the display unit 121 while pressing a specific button on the remote control unit 200. Accordingly, a selection region in the display 121 corresponding to the pointer 205 may be zoomed in and displayed.

On the contrary, when a user moves the remote control unit 200 to be close to the display unit 121, a selection region in the display unit 121 corresponding to the pointer 205 is zoomed out and displayed.

When the remote control unit 200 is away from the display unit 121, the selection region may be zoomed out and when the remote control unit 200 is closed to the display unit 121, the selection region may be zoomed in.

Also, while a specific button on the remote control unit 200 is pressed, a vertical or lateral movement may not be recognized. That is, when the remote control unit 200 moves away from or close to the display unit 121, vertical and lateral movements may not be recognized and only forward and backward movements may be recognized. While a specific button on the remote control unit 200 is not pressed, only the pointer 205 moves according to the vertical or horizontal movement of the remote control device 200.

A speed at which the pointer 205 moves or a direction in which the pointer 205 moves may correspond to a speed at which the remote control unit 200 moves or a direction in which the remote control unit 200 moves.

The pointer in the specification means an object displayed on the display unit 121 in response to the operation of the remote control unit 200. Thus, there may be objects having various shapes in addition to an arrow shape shown in the FIGS. 12a to 12c as the pointer 205. For example, the shape may be a concept including a dot, a cursor, a prompt or a thick contour. In addition, the pointer 205 may be displayed to correspond to any one point of horizontal and vertical axes on the display unit 121 and may also be displayed to correspond to a plurality of points including a line or a surface.

Figure 13:
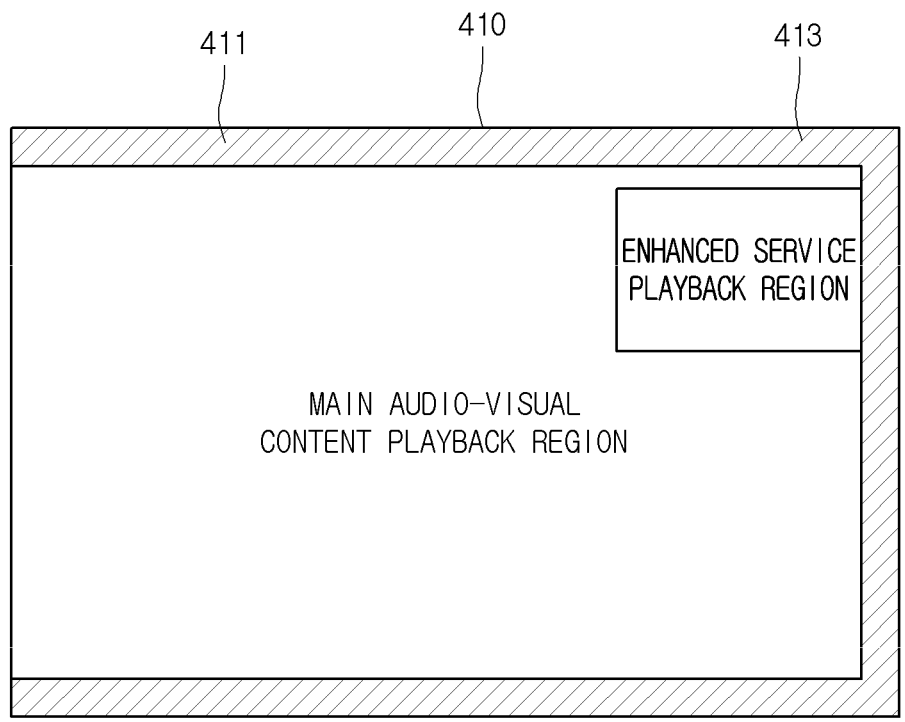
FIGS. 13 and 14 are diagrams for explaining a method of controlling an application according to various embodiments.
Figure 13:
Figure 13:
Figure 14:
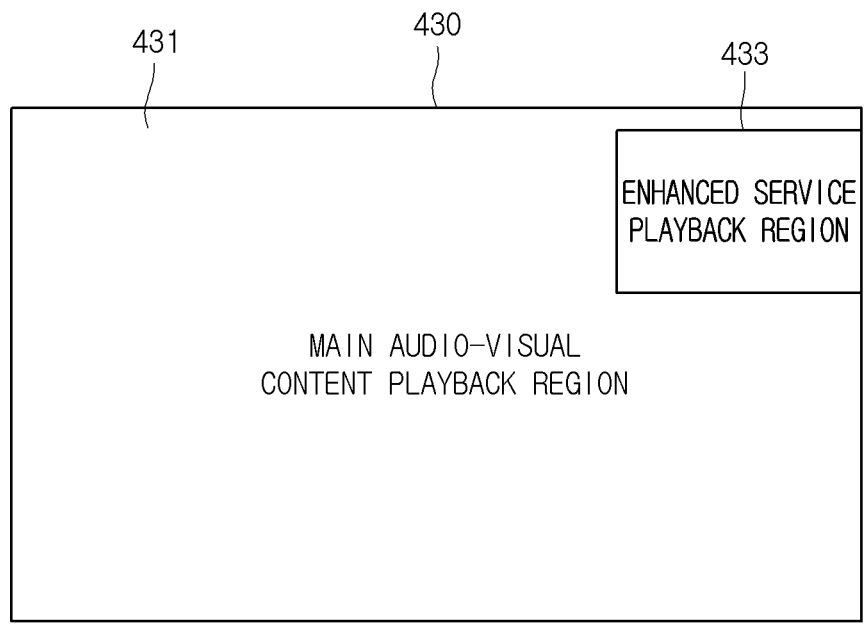

FIGS. 13 and 14 are diagrams for explaining a method of controlling an application according to various embodiments.

Referring to FIG. 13, a screen 410 provided by the video display device 100 may represent a screen on which an ACR application is executed, and may include a Live TV application region 411 and an ACR application processing region 413.

The screen 410 in the embodiment of FIG. 13 may include one layer, which may include the Live TV application processing region 411 and the ACR application processing region 413.

When the Live TV application processing region 411 receives a cursor event, a Live TV application may execute the function of the video display device 100 corresponding to the cursor event. A cursor may be a pointer that moves according to the motion of the remote control unit such as a spatial remote control, and the cursor event may be an input representing that selection is performed by the pointer. The Live TV application may be an application that controls a function related to the playback of main audio-visual content. The Live TV application may be included in the play controlling unit 113.

When the ACR application processing region 413 receives the cursor event, an ACR application may be controlled in response to the cursor event.

Next, FIG. 14 is described.

Referring to FIG. 14, the screen 430 provided by the video display device 100 may represent a screen on which the ACR application is executed, and may include a main audio-visual content playback region 431 and an enhanced service playback region 433.

The screen 430 in the embodiment of FIG. 14 may include one layer, which may include the main audio-visual content playback region 431 and the enhanced service playback region 433.

When the main audio-visual content playback region 431 receives a cursor event, the Live TV application may execute the function of the video display device 100 corresponding to the cursor event. A cursor may be a pointer that moves according to the motion of the remote control unit such as a spatial remote control, and the cursor event may be an input representing that selection is performed by the pointer. The Live TV application may be an application that controls a function related to the playback of main audio-visual content. The Live TV application may be included in the play controlling unit 113.

When the enhanced service playback region 433 receives the cursor event, the ACR application may be controlled in response to the cursor event.

According to an embodiment of FIGS. 13 and 14, one layer is divided into a region on which the Live TV application may be processed and a region on which the ACR application may be processed and thus it is difficult to deal with various user experience scenarios. For example, when the ACR application is executed, it is difficult to significantly change the size of a region playing an enhanced service.

In another embodiment, all cursor events and key events may be processed by the Live TV application. The Live TV application may generate a code corresponding to a key event needed for controlling the ACR application and propagate the code to the ACR application. The ACR application may be controlled according to a generated control command.

However, the code correlation between the Live TV application and the ACR application increases in this case and it is difficult to maintain in the future.

Figure 15:
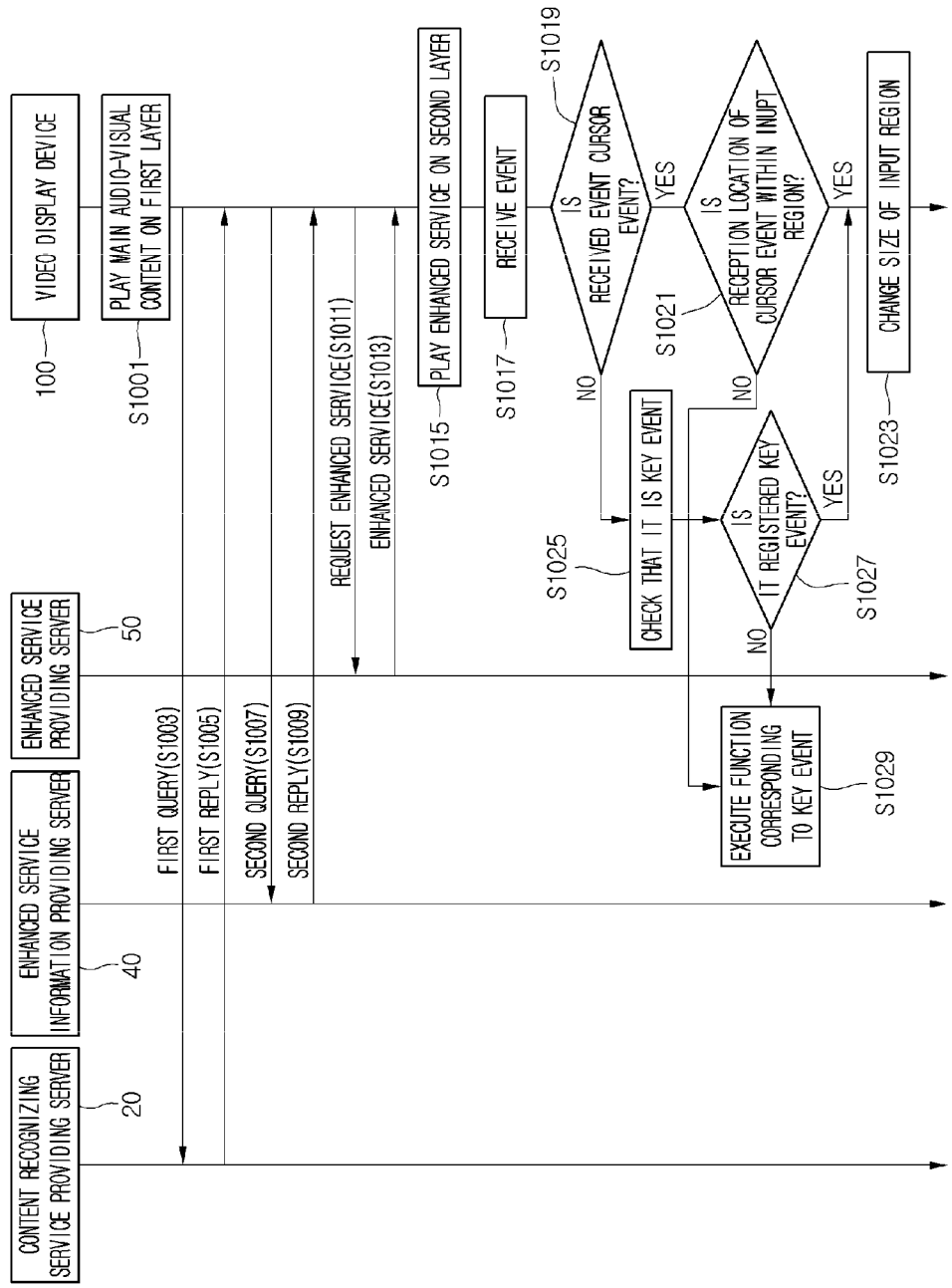
FIG. 15 is a ladder diagram of a data flow in a network topology according to another embodiment.

FIG. 15 is a ladder diagram of a data flow in a network topology according to another embodiment.

The play controlling unit 113 of the video display device 100 plays main audio-visual content on a first layer in operation S1001.

In an embodiment, the video display device 100 may play main audio-visual content and an enhanced service through a plurality of layers. The plurality of layers may include the first layer and a second layer. The first layer may be a layer for playing the main audio-visual content and the second layer may be a layer for playing the enhanced service. The first layer and the second layer may be overlaid.

In an embodiment, the first layer may be a layer on which the Live TV application is executed, and the second layer may be a layer on which the ACR application 139a as described in FIG. 11 is executed.

The Live TV application may be an application that controls a function related to the playback of the main audio-visual content. The Live TV application may be included in the play controlling unit 113.

The ACR application 139a may be an application that may provide a user with an enhanced user experience with the aid of ACR. The ACR application 139a may also be an application that may be downloaded from an application store or the Internet, or may also be a Uniform Resource Locator (URL), simply. The ACR application 139a may provide content target advertisement, a content provider portal service, a program specific service such as an electronic program guide (EPG) service, or a content provider specific service.

The enhanced service management unit 130 of the video display device 100 transmits a first query to the content recognizing service providing server 20 in operation S1003.

In an embodiment, when the content recognizing service providing server 20 is the watermark server 21, the enhanced service management unit 130 may extract watermark information from the audio samples of some sections or some frames of main audio-visual content, and may obtain the address of the watermark server 21 through extracted watermark information. The enhanced service management unit 130 may access the watermark server 21 corresponding to the address of the watermark server 21 obtained, and transmit a first query for identifying the main audio-visual content.

In another embodiment, when the content recognizing service providing server 20 is the fingerprint server 22, the enhanced service management unit 130 may extract characteristic information from the audio samples of some sections or some frames of the main audio-visual content, access the fingerprint server 22 corresponding to a preset address of the fingerprint server 22, and transmit a first query including extracted characteristic information.

The enhanced service management unit 130 of the video display device 100 receives a first replay corresponding to the first query from the content recognizing service providing server 20 in operation S1005.

In an embodiment, the first reply may include at least one of content information, enhanced service information, and an available enhanced service.

When the address of the enhanced service information providing server is obtained through the first replay, the enhanced service management unit 130 of the video display device 100 access the enhanced service information providing server 40 corresponding to the address of the enhanced service information providing server obtained and transmits a second query S1007 including content information in operation S1007.

The enhanced service information providing server 40 searches for one or more available enhanced services relating to content information on the second query. Then, the enhanced service information providing server 40 provides the video display device 100 with enhanced service information for one or more available enhanced services as a second reply to the second query in operation S1009.

When the enhanced service management unit 130 of the video display device 100 obtains one or more available enhanced service addresses through the first reply or the second reply, it accesses one or more available enhanced service addresses to request an enhanced service in operation S1011, and obtains the enhanced service from the enhanced service providing server 50 in operation S1013.

The enhanced service management unit 130 of the video display device 100 plays an obtained enhanced service on the second layer in operation S1015.

That is, the enhanced service management unit 130 may play the enhanced service on the second layer while the play controlling unit 113 plays main audio-visual content on the first layer. Related description is provided with reference FIGS. 16 to 18.

Figure 16:
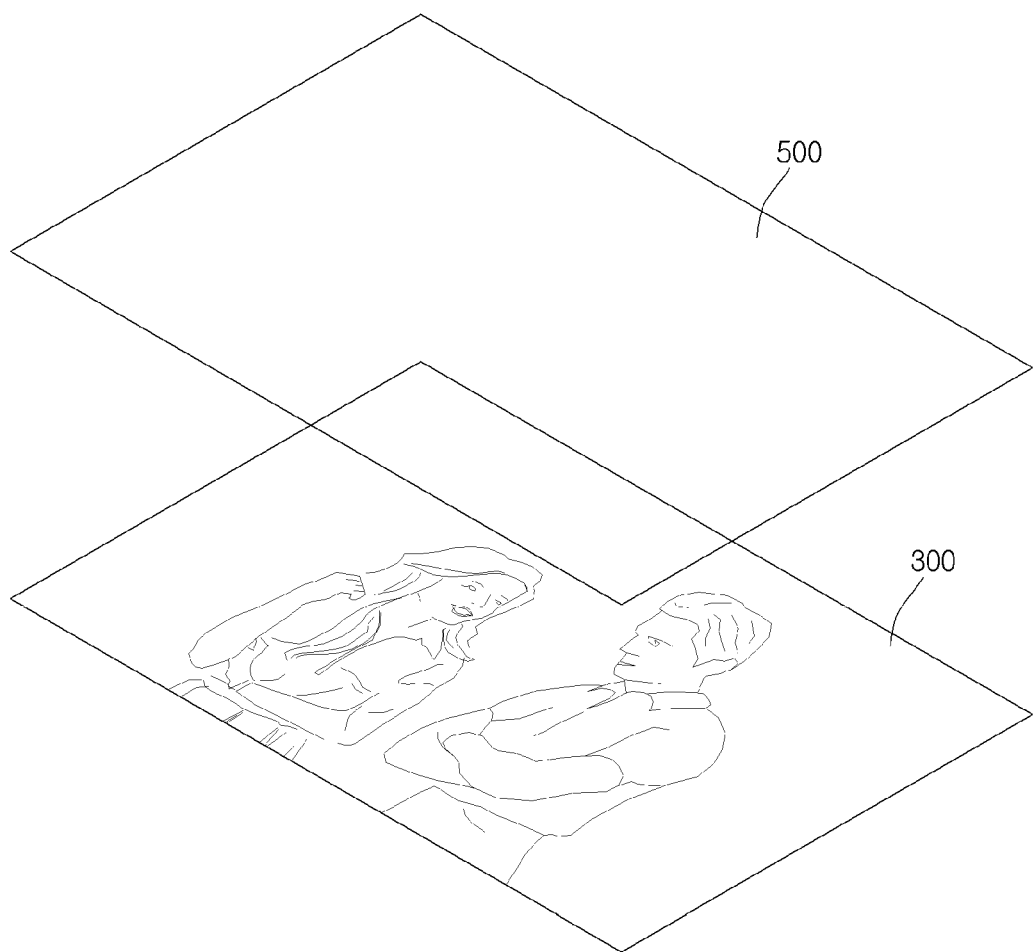
FIGS. 16 to 18 are diagrams for explaining an embodiment of playing main audio-visual content and enhanced services by using multiple layers according to an embodiment.
Figure 17:
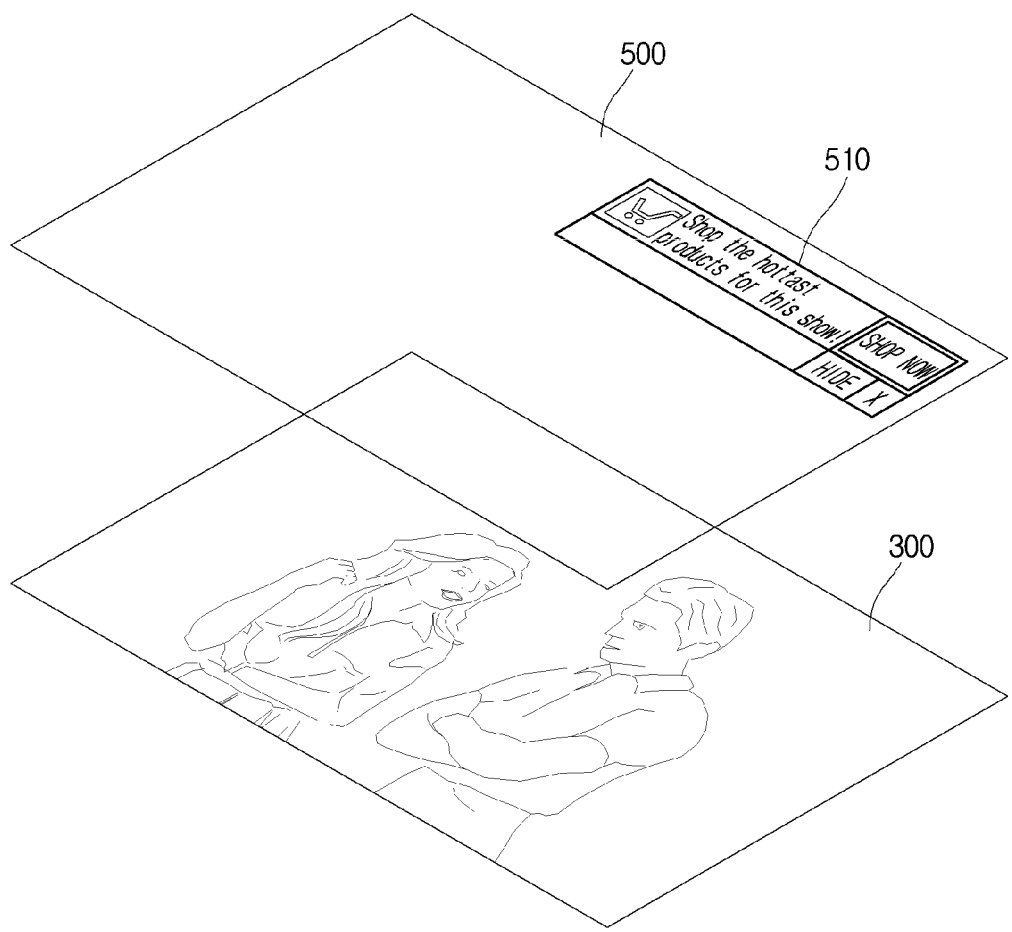
Figure 18:
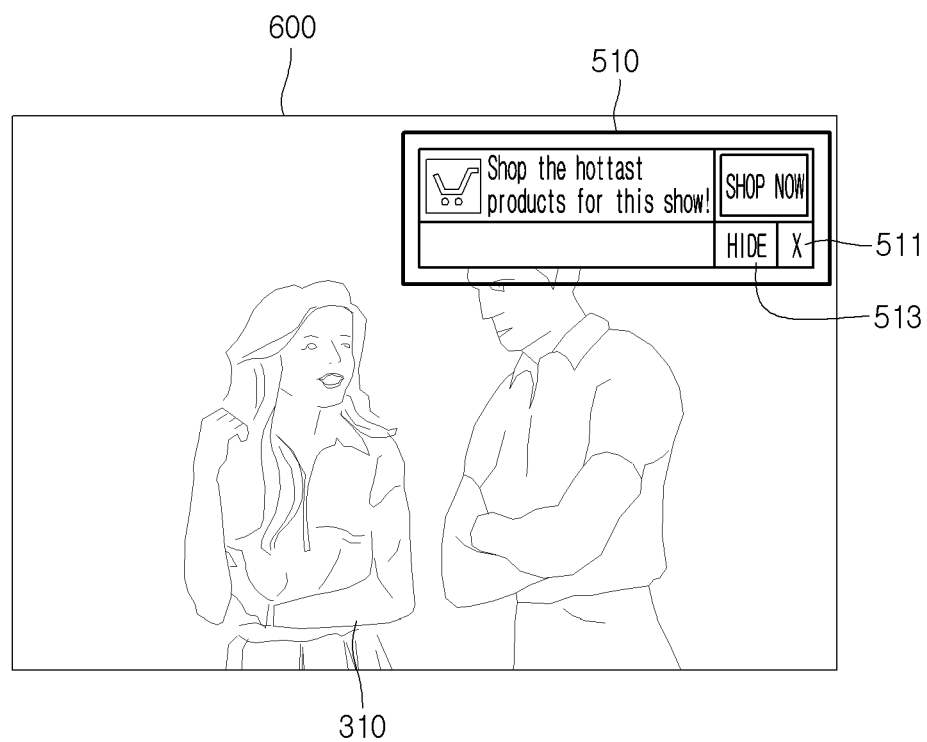

FIGS. 16 to 18 are diagrams for explaining an embodiment of playing main audio-visual content and enhanced services by using multiple layers according to an embodiment.

Referring to FIG. 16, the playback screen of the video display device 100 may include multiple layers that include a first layer 300 and a second layer 500. The first layer 300 and the second layer 500 may be overlapped and controlled as a group. The first layer 300 may be controlled by a Live TV application and the second layer 500 may be controlled by an ACR application. The second layer 500 may include an input region. When a cursor event to be described is received within the input region, the ACR application may process the cursor event, and when the cursor event is received at regions other than the input region, the Live TV application may process the cursor event that is received at the regions other than the input region. That is, when the cursor event is received at the input region on the second layer 500 and when the cursor event is received at the regions other than the input region on the second layer 500, received cursor events may be processed by different applications respectively.

Although the first layer 300 may be named as a Live TV application layer and the second layer 500 may be named as an ACR application layer, it is only an example.

The first layer 300 may correspond to the execution screen of the Live TV application and the second layer 500 may correspond to the execution screen of the ACR application. The play controlling unit 113 of the video display device 100 may play main audio-visual content through the first layer 300 and the enhanced service management unit 130 may play an enhanced service through the second layer 500.

The ACR application may transparently display the second layer 500 before playing the enhanced service, and partially transparently display the second layer 500 after playing the enhanced service.

Next, the structure of a layer after the ACR application is executed is described with reference to FIGS. 17 and 18.

Referring to FIG. 17, the ACR application may play the enhanced service obtained from the enhanced service providing server 50 on the second layer 500. The ACR application may automatically play the enhanced service even if a user takes any action. The ACR application automatically plays an enhanced service such as scene related information provided by a content provider or a broadcasting station without a user's input according to the playback time of main audio-visual content during the playback of the main audio-visual content. That is, the content provider or the broadcasting station may completely control the ACR application.

When the enhanced service is played on the second layer 500, a screen 600 that the user actually sees may be that shown in FIG. 18. That is, when the first layer 300 on which main audio-visual content is played and the second layer 500 on which an enhanced service is played are overlaid, the screen 600 that the user actually sees may be that shown in FIG. 18.

The second layer 500 may include an input region 510 on which the enhanced service is played. The input region may be a region that is managed by the ACR application. In particular, the input region 510 may be a region for enabling the ACR application to process the reception of an event. Regions other than the input region 510 on the second layer 500 may enable the Live TV application to process the reception of an event.

The input region 510 may be a region that may receive a cursor event in order to provide an enhanced service according to the execution of the ACR application. A cursor may be a pointer that moves according to the motion of a remote control unit such as a spatial remote control, and the cursor event may be an input representing that the input region 510 has been selected by a pointer.

In particular, when the cursor event is received within the input region 510, the ACR application may manage the cursor event received. When the cursor event is received within the input region 510, the ACR application may change the size of a region providing the enhanced service according to a received cursor event.

When the cursor event is received at regions other than the input region 510, the Live TV application may manage the cursor event received. That is, when the cursor event is received at regions other than the input region 510, the Live TV application may execute the function of the video display device 100 corresponding to the cursor event received. Related description is provided below in detail.

In an embodiment, the input region 510 may include a plurality of regions. That is, the second layer 500 may include a plurality of input regions.

In an embodiment, the input region 510 may be arranged on a fixed location on the second layer 500.

In another embodiment, the location of the input region 510 may be changed according to the characteristic of the playback screen of main audio-visual content. Related description is provided below.

Referring to FIG. 18, the screen 600 on which the ACR application is executed may include the input region 510 and a main audio-visual content region 310 on which main audio-visual content is displayed. The input region 510 on which an enhanced service is played includes a button 511 for closing the ACR application and a button 513 for hiding the ACR application. When remaining regions other than regions occupied by the button 511 for closing the ACR application and the button 513 for hiding the ACR application within the input region 510 receive a cursor event, the size of the input region 510 may be changed.

As shown in FIG. 17, the main audio-visual content region 310 may be arranged on the first layer 300 and the input region 510 may be arranged on the second layer 500. When the first layer 300 and the second layer 500 are overlaid, a user may see the screen of FIG. 18.

Refer back to FIG. 15.

The enhanced service management unit 130 of the video display device 100 receives an event through a user input during the playback of the enhanced service in operation S1017.

In an embodiment, an event received through the user input may be a cursor event. A cursor may be a pointer that moves according to the motion of a remote control unit such as a spatial remote control, and the cursor event may be an input representing that selection is performed by the pointer.

In another embodiment, an event received through the user input may be a key event. The key event may be an event generated by the input of a key button of the remote control unit.

The enhanced service management unit 130 of the video display device 100 checks whether a received event is the cursor event in operation S1019, and when the received event is the cursor event, the enhanced service management unit 130 checks whether the reception location of the cursor event is within the input region on the second layer in operation S1021.

When the reception location of the cursor event is within the input region on the second layer, the enhanced service management unit 130 changes the size of the input region playing an enhanced service through the play controlling unit 113 in operation S1023.

Operations S1017 to 1023 are described with reference to FIGS. 19 and 20.

Figure 19:
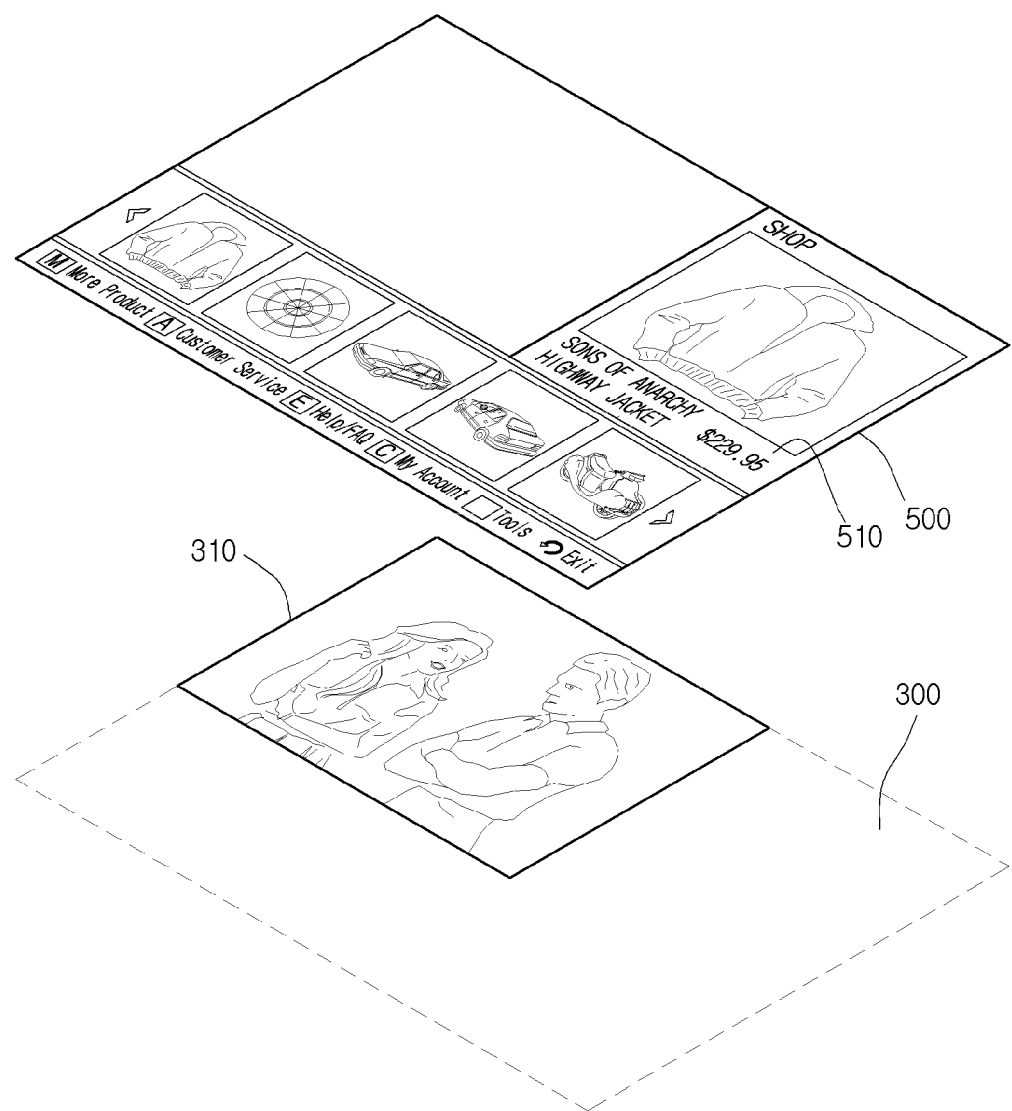
FIGS. 19 and 20 are diagrams for explaining a screen providing an enhanced service related to main audio-visual content according to an embodiment.
Figure 20:
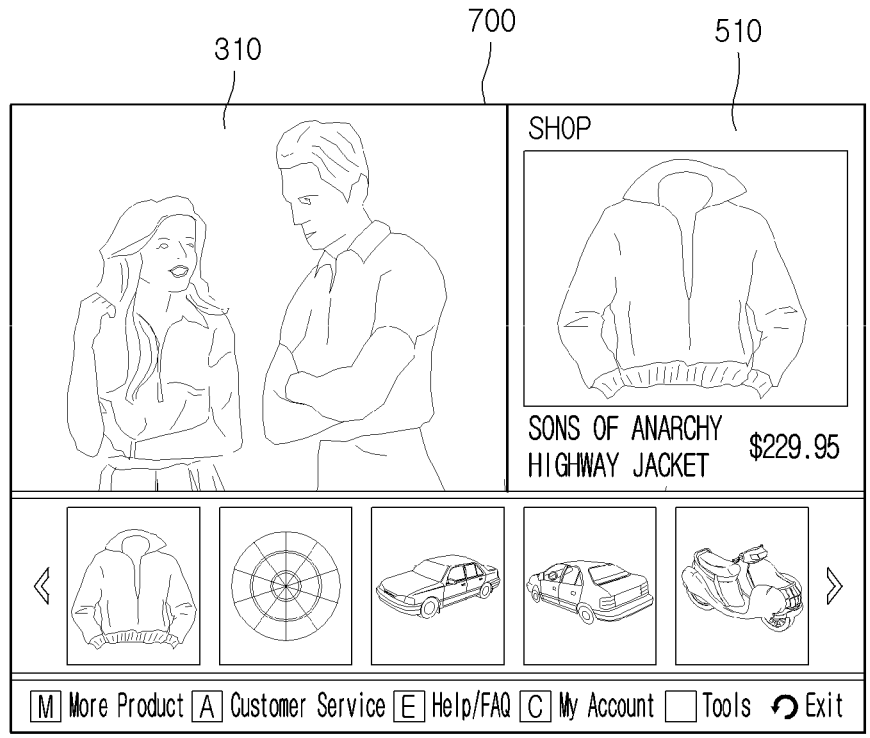

FIGS. 19 and 20 are diagrams for explaining a screen providing an enhanced service related to main audio-visual content according to an embodiment.

When the cursor event is received within the input region 510 in FIG. 18, the video display device 100 may change the size of the input region 510 playing an enhanced service. In particular, as shown in FIG. 19, the video display device 100 may reduce the size of the main audio-visual content region 310 in the first layer 300 and expand the size of the input region 510 in the second layer 500. In particular, the video display device 100 may provide the detailed information on the enhanced service provided on the input region 510, increasing the size of the input region 510. For example, the input region 510 of FIG. 18 may include only enhanced service information representing that there is product information related to the main audio-visual content, and the input region 510 sized according to the reception of a cursor event within the input region 510 may include detailed product information including the price, kind and name of a corresponding product.

Referring to FIG. 20, the video display device 100 displays a screen 700 on which the first layer 300 including the main audio-visual content region 310 and the second layer 500 including the input region 510 expanded are overlapped and displayed.

Refer back to FIG. 15.

When a received event is not a cursor event in operation S1019, the enhanced service management unit 130 of the video display device 100 checks the received event as a key event in operation S1025, and checks whether a received key event is a registered key event in operation S1027.

When it is checked that the received key event is the registered key event, the enhanced service management unit 130 changes the size of the input region playing the enhanced service, and when it is checked that the received key event is not the registered key event, the function of the video display device 100 corresponding to the key event is executed in operation S1029.

In an embodiment, the registered key event may be one of registered key commands used for the control of an ACR application. The registered key commands used for the control of the ACR application may correspond respectively to key buttons of a remote control unit and may be preset. For example, the registered key commands may correspond to a back button representing "Go back", a button for closing the ACR application, an OK button representing "Selection", a direction button indicating a direction, and a number button for a number input. Masking meaning the correspondence relation between the key button of the remote control unit and a key event for the control of the ACR application may depend on setting.

When the received key event is the registered key event, the enhanced service management unit 130 may determine it to be an input for the control of the ACR application and may control the ACR application according to a received key event. For example, when the received key event is the registered key event and corresponds to an event changing the size of the input region 510 in FIG. 18, the video display device 100 may expand the size of the input region 510 in response to the received key event as shown in FIG. 20 and simultaneously provide detailed information on a product related to main audio-visual content.

The memory 150 may store the correspondence relation between a key event corresponding to an input from a key button and a function for the control of the ACR application.

When the received key event is not the registered key event for the control of the ACR application, the video display device 100 may perform a function such as a channel change or volume control corresponding to that key event.

Figure 21:
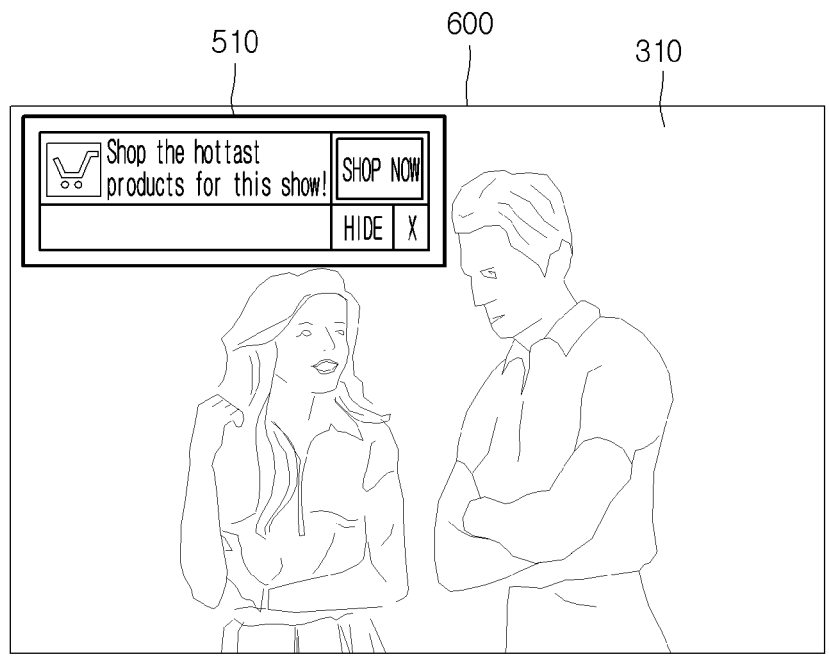
FIG. 21 is a diagram for explaining an embodiment of changing the location of an input region based on the characteristic of a playback screen of main audio-visual content according to an embodiment of the present invention.

Next, FIG. 21 is described.

FIG. 21 is a diagram for explaining an embodiment of changing the location of an input region based on the characteristic of a playback screen of main audio-visual content according to an embodiment of the present invention.

According to an embodiment, the location of the input region 510 arranged on the second layer may be changed. In particular, the video display device 100 may arrange the input region 510 not to disturb the viewing of main audio-visual content by a user on the playback screen of the main audio-visual content on the first layer. For example, the video display device 100 may arrange the input region 510 playing an enhanced service on the background screen on which the main character or main item of the main audio-visual content is not located. For example, the video display device 100 may arrange the input region 510 on a full black or full white region on the playback screen of the main audio-visual content.

That is, as shown in FIG. 21, when an ACR application is executed and plays an enhanced service, the input region 510 of the second layer may be arranged on a region not disturbing user's viewing within the main audio-visual content playback region 310 of the first layer.

Since the user may use the enhanced service without disturbance in viewing the main audio-visual content, convenience may increase.

Next, a process of controlling the operation of the ACR application or the Live TV application according to the reception of an event with reference to FIGS. 1 to 21 is described with reference to FIG. 22.

Figure 22:
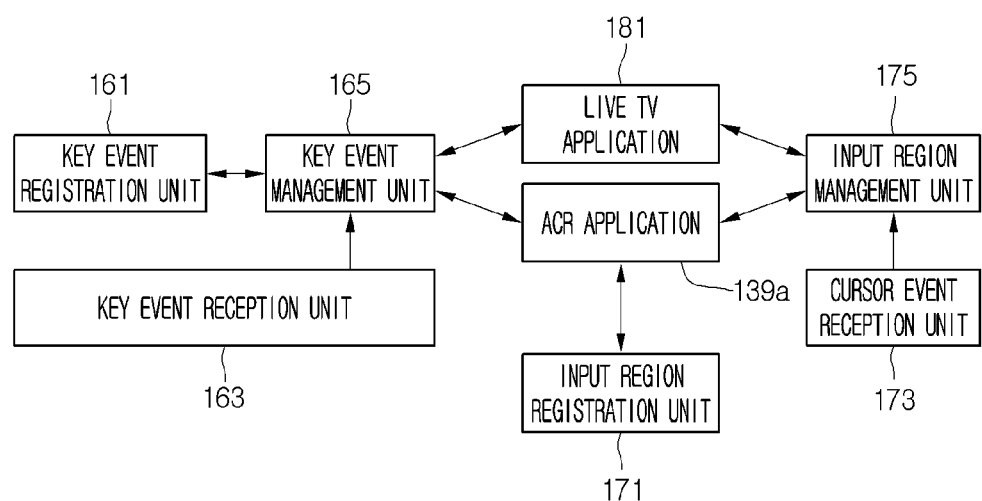
FIG. 22 is a block diagram of additional components of a video display device according to an embodiment.

FIG. 22 is a block diagram of additional components of a video display device according to an embodiment.

That is, FIG. 22 is a diagram for explaining components added to the block diagram of the video display device 100 of FIG. 10. The block diagram of FIG. 22 also includes components shown in the block diagram of FIG. 10.

Referring to FIG. 22, the video display device 100 may further include a key event registration unit 161, a key event reception unit 163, a key event management unit 165, an input region registration unit 171, a cursor event reception unit 173, an input region management unit 175, an ACR application 139a, and a Live TV application 181.

The key event registration unit 161 may register and store a key event to be used by the ACR application 139a. The key event registration unit 161 may store the correspondence relation between a plurality of key events and functions to be executed by the ACR application 139a. For example, the <1> button input of a remote control unit is a registered key event, the <1> button input may correspond to a function closing the execution of the ACR application 139a but is not needed to be limited thereto. That is, when <1> button is input, number<1> may be input onto the text input box of the input region on the second layer 500.

The key event reception unit 163 may receive a key event from the remote control unit 200 and transmit a received key event to the key event registration unit 161.

The key event management unit 165 may check whether the key event received by the key event reception unit 163 is an event registered with the key event registration unit 161. When the received key event is a registered event, the key event management unit 165 may transmit the received key event to the ACR application 139a, and when the received key event is not the registered key event, the key event management unit 165 may transmit the received key event to the Live TV application 181.

The input region registration unit 171 may register an input region on the second layer 500 by the control of the ACR application 139a when a cursor event input is needed. The input region is located on the second layer 500 and may be a region that may receive a cursor event in order to provide an enhanced service according to the execution of the ACR application 139a. The input region is a region for playing the enhanced service and may be managed by the ACR application 139a. The input region may be located on a certain region on the second layer 500 as described in FIGS. 16 to 18.

The cursor event reception unit 173 may receive a cursor event from the remote control unit 200 or a mouse.

The input region management unit 175 may determine whether the location of the cursor event received through the input region registration unit 171 is within the input region. When it is determined that the location of the cursor event received is within the input region, the input region management unit 175 may transmit the cursor event to the ACR application 139a and when it is determined that the location of the cursor event is not within the input region, the input region management unit 175 may transmit the cursor event to the Live TV application 181. That is, when the second layer 500 receives the cursor event but the received cursor event is not within the input region, the cursor event may be processed by the Live TV application 181, not by the ACR application 139a.

The ACR application 139a may receive a registered key event from the key event management unit 165 and execute the function of the ACR application 139a corresponding to a received key event. The function of the ACR application 139a may include a function related to the playback of an enhanced service. The function of the ACR application 139*a* may include playing, closing and selecting an enhanced service but is not need to be limited thereto.

The ACR application 139*a* may receive a cursor event in an input region from the input region management unit 175 and execute the function of the ACR application 139*a* corresponding to a received cursor event.

The ACR application 139*a* may be included in the enhanced service management unit 130 in FIG. 10.

The Live TV application 181 may receive a key event not registered from the key event management unit 165 and execute the function of the Live TV application 181 corresponding to a received key event. The function of the Live TV application 181 may include a channel change or volume control but is not needed to be limited thereto.

The Live TV application 181 may receive a cursor event not in the input region from the input region management unit 175 and execute the function of the Live TV application 181 corresponding to a received cursor event.

The Live TV application 181 may be included in the play controlling unit 113 in FIG. 10 but is not needed to be limited thereto and may exist as a separate component.

According to various embodiments, the above-described method may be embodied as processor readable codes on a program-recorded medium. Examples of the processor readable medium are a ROM, a RAM, a CD-ROM, a magnetic tape, a floppy disk, and an optical data storage device and include a carrier wave form (such as transmission through the Internet).

The above-described video display device is not limited to the configuration and method of the above-described embodiments, and some or all of the embodiments may also be selectively combined so that various variations may be made.

What is claimed is:

1. A method of operating a video display device comprising a display unit, the method comprising:
   playing uncompressed audio-visual content on a first layer of the display unit;
   obtaining content information on the uncompressed audio-visual content based on some of the uncompressed audio-visual content;
   obtaining an enhanced service based on the content information; and
   playing the obtained enhanced service on an input region included in a second layer of the display unit,
   wherein the first layer and the second layer are overlapped each other, the input region is a region for receiving an event for controlling playback of the enhanced service, and
   wherein the method further comprising:
   expanding a size of the input region if the event is received.

2. The method according to claim 1, wherein the event is any one of a cursor event representing a cursor input moving according to the motion of a remote control unit or a pre-registered key event representing a key input of the remote control unit.

3. The method according to claim 2, wherein the first layer and the second layer are controlled through different applications, respectively.

4. The method according to claim 3, wherein the first layer is controlled through a first application controlling the playback of the uncompressed audio-visual content, and the second layer is controlled through a second application controlling the playback of the enhanced service.

5. The method according to claim 4, wherein the second application controls the playback of the enhanced service when the cursor event is received within the input region of the second layer, and
   the first application controls the playback of the uncompressed audio-visual content when the cursor event is received at remaining regions other than the input region.

6. The method according to claim 1, wherein an expanded input region comprises detailed information on the enhanced service related to the uncompressed audio-visual content.

7. The method according to claim 6, wherein the expanding of the size of the input region is performed when the event is the key event and the reception location of the key event is within the input region.

8. The method according to claim 1, wherein the obtaining of the content information comprises:
   extracting characteristic information on some of the content; and
   obtaining the content information through a reply to a query comprising the characteristic information.

9. A video display device comprising:
   a display unit comprising a first layer and a second layer;
   a reception unit configured to obtain uncompressed audio-visual content;
   an enhanced service management unit configured to obtain content information on the uncompressed audio-visual content based on some of the uncompressed audio-visual content, wherein the enhanced service management unit obtains an enhanced service based on the content information; and
   a play controlling unit configured to play the uncompressed audio-visual content and the enhanced service on the display unit,
   wherein the uncompressed audio-visual content is played on the first layer, the enhanced service is played on an input region included in the second layer,
   the first layer and the second layer are overlapped each other,
   the input region is a region for receiving an event for controlling playback of the enhanced service, and
   the enhanced service management unit expands a size of the input region if the event is received.

10. The video display device according to claim 9, wherein the event is any one of a cursor event representing a cursor input moving according to the motion of a remote control unit or a pre-registered key event representing a key input of the remote control unit.

11. The video display device according to claim 10, wherein the first layer and the second layer are controlled through different applications, respectively.

12. The video display device according to claim 11, wherein the first layer is controlled through a first application controlling the playback of the uncompressed audio-visual content, and
    the second layer is controlled through a second application controlling the playback of the enhanced service.

13. The video display device according to claim 12, wherein the second application controls the playback of the enhanced service when the cursor event is received within the input region of the second layer, and
    the first application controls the playback of the uncompressed audio-visual content when the cursor event is received at remaining regions other than the input region.

14. The video display device according to claim 9, wherein an expanded input region comprises detailed information on the enhanced service related to the uncompressed audio-visual content.

15. The video display device according to claim 14, wherein the enhanced service management unit expands the size of the input region when the event is the key event and the reception location of the key event is within the input region.

16. The video display device according to claim 9, wherein the enhanced service management unit extracts characteristic information on some of the content and obtains the content information through a reply to a query comprising the characteristic information.

* * * * *